United States Patent [19]

Nadehara

[11] Patent Number: 5,745,397
[45] Date of Patent: Apr. 28, 1998

[54] ADDITION OVERFLOW DETECTION CIRCUIT

[75] Inventor: Kouhei Nadehara, Tokyo, Japan

[73] Assignee: NEC Corporation, Tokyo, Japan

[21] Appl. No.: 597,189

[22] Filed: Feb. 6, 1996

[30] Foreign Application Priority Data

Feb. 7, 1995 [JP] Japan ................... 7-041435

[51] Int. Cl.$^6$ .................... G06F 7/38; G06F 7/50
[52] U.S. Cl. .................. 364/745.03; 364/745.04; 364/784.01
[58] Field of Search ............ 364/715.06, 737, 364/745, 768, 769, 784, 776, 787, 788

[56] References Cited

U.S. PATENT DOCUMENTS 4,768,160  8/1988  Yokoyama .................. 364/745
5,369,439  11/1994  Kim .......................... 364/787

FOREIGN PATENT DOCUMENTS 3-62124  3/1991  Japan .

OTHER PUBLICATIONS

J. Cortadella et al., "Evaluation of A + B = K conditions Without Carry Propagation", *IEEE Transactions on Computers*, vol. 41, No. 11, Nov. 1992, pp. 1484–1488.

*Primary Examiner*—Chuong Dinh Ngo
*Attorney, Agent, or Firm*—Sughrue, Mion, Zinn, Macpeak & Seas, PLLC

[57] ABSTRACT

The invention provides an addition overflow detection circuit which can detect an addition overflow at a high rate even where the output bit number is remarkably smaller than the input bit number and which is realized with a comparatively small amount of hardware. An unsigned augend and an unsigned addend of the n bit length are individually divided into lower m bits and upper n–m bits. The lower bits are inputted to an adder, and a carry from the (m–1)th bit to the mth bit is detected from the output of the adder. The upper bits are inputted to both of two fast adder-comparators, by which it is detected that all bits of the sum of them are equal to 1 or 0, respectively. In response to presence or absence of the carry, one of detection outputs of the fast adder-comparators is selected and logically inverted to obtain an overflow detection result.

13 Claims, 21 Drawing Sheets

FIG. 2

| $s_m \sim s_n$ | $r_m \sim r_n$ | $c_{m-1}$ | REQUIREMENT |
|---|---|---|---|
| ALL BITS 0 | ALL BITS 1 | 1 | REQUIREMENT 2-1 |
| | ALL BITS 0 | 0 | REQUIREMENT 2-2 |

FIG. 6

| $s_m \sim s_{n-1}$ | $r_{m+1} \sim r_{n-1}$ | $r_m$ | $c_{m-1}$ | REQUIREMENT |
|---|---|---|---|---|
| ALL BITS 0 | ALL BITS 1 | 1 | 1 | REQUIREMENT 6-1 |
| | ALL BITS 0 | 0 | 0 | REQUIREMENT 6-2 |

FIG. 9

| $s_{m-1} \sim s_n$ | $q_m \sim q_n$ | $q_{m-1}$ | $c_{m-2}$ | REQUIREMENT |
|---|---|---|---|---|
| ALL BITS 1 | ALL BITS 1 | 0 | 1 | REQUIREMENT 9-1 |
|  | ALL BITS 1 | 1 | 0 | REQUIREMENT 9-2 |
| ALL BITS 0 | ALL BITS 1 | 1 | 1 |  |
|  | ALL BITS 0 | 0 | 0 | REQUIREMENT 9-3 |

FIG. 10

| CARRY 78 | COMPARATOR OUTPUT 79 | COMPARATOR OUTPUT 80 | COMPARATOR OUTPUT 81 | OVERFLOW DETECTION RESULT 82 |
|---|---|---|---|---|
| 0 | 0 | 0 | 0 | 1 |
| 0 | 0 | 0 | 1 | 0 |
| 0 | 0 | 1 | 0 | 0 |
| 0 | 0 | 1 | 1 | X |
| 0 | 1 | 0 | 0 | 1 |
| 0 | 1 | 0 | 1 | X |
| 0 | 1 | 1 | 0 | X |
| 0 | 1 | 1 | 1 | X |
| 1 | 0 | 0 | 0 | 1 |
| 1 | 0 | 0 | 1 | 1 |
| 1 | 0 | 1 | 0 | 0 |
| 1 | 0 | 1 | 1 | X |
| 1 | 1 | 0 | 0 | 0 |
| 1 | 1 | 0 | 1 | X |
| 1 | 1 | 1 | 0 | X |
| 1 | 1 | 1 | 1 | X |

X...NOT DEFINED

FIG. 13

| $s_{m-1} \sim s_n$ | $q_m \sim q_n$ | $q_{m-1}$ | $c_{m-2}$ | REQUIREMENT |
|---|---|---|---|---|
| ALL BITS 1 | ALL BITS 1 | 0 | 1 | REQUIREMENT 12-1 |
|  | ALL BITS 1 | 1 | 0 |  |
| ALL BITS 0 | ALL BITS 1 | 1 | 1 |  |
|  | ALL BITS 0 | 0 | 0 | REQUIREMENT 12-2 |

FIG. 14

| SELECTOR OUTPUT 115 | ADDITION RESULT UPPER 112 | ADDITION RESULT LOWER 111 | CARRY 110 | OVERFLOW DETECTION RESULT 116 |
|---|---|---|---|---|
| 0 | X | X | X | 1 |
| 1 | 0 | 0 | 0 | 0 |
| 1 | 0 | 0 | 1 | 1 |
| 1 | 0 | 1 | 0 | 1 |
| 1 | 0 | 1 | 1 | 1 |
| 1 | 1 | 0 | 0 | 1 |
| 1 | 1 | 0 | 1 | 0 |
| 1 | 1 | 1 | 0 | 0 |
| 1 | 1 | 1 | 1 | 0 |

X...NOT DEFINED

ADDITION OVERFLOW DETECTION CIRCUIT

BACKGROUND OF THE INVENTION

1. Field of the Invention

This invention relates to an addition overflow detection circuit which detects an overflow when a result of addition of unsigned or signed numbers cannot be represented correctly, and more particularly to an addition overflow detection circuit which operates in parallel to an adder to produce an overflow determination result at a high rate.

2. Description of the Related Art

An exemplary one of conventional addition overflow detection circuits will be described with reference to FIGS. 18 to 21.

It is assumed to try to detect, when an augend $A=a_i$ and an addend $B=b_i$ ($0 \leq i \leq n$) of the n bit length represented by unsigned or signed binary numbers are inputted to an adder and an addition result $S=s_i$ ($0 \leq i \leq n$) of the n+1 bit length is obtained, whether the result $s_i$ can be represented with a predetermined bit width m ($m \leq n$) or cannot be represented correctly and overflows.

A most basic overflow detection circuit refers to the output S of the adder to detect the overflow. An example of the overflow detection circuit wherein n=m=16 is illustrated in FIG. 18. In the construction shown in FIG. 18, an augend A 141 and an addend B 142 are added by a 16-bit length adder 131, and an addition result 143 of the 16-bit length adder 131 and a carry 144 from bit 15 are inputted to an overflow detection circuit 132 to obtain an overflow detection result 145. The overflow detection circuit of the construction, however, is disadvantageous in that, since an overflow detection process 148 is started with the overflow detection circuit 132 after a 16-bit length addition process 147 by the adder 131 is completed as seen in FIG. 19, the delay time after an augend and an addend 146 are supplied to the adder 131 is long.

An improved overflow detection circuit wherein addition and detection of an overflow are partially performed parallelly in order to overcome the drawback just described has been proposed in Japanese Patent Laid-Open Application No. Heisei 3-62124. The circuit construction of the improved overflow detection circuit is shown in FIG. 20. Referring to FIG. 20, in the circuit shown, an augend 161 and an addend 162 are inputted to a 16-bit length adder 151 to obtain an addition result 165, and totalling 5 bits of the upper two bits $a_{14}, a_{15}$ 163 of the augend 161, the upper two bits $b_{14}, b_{15}$ of the addend 162 and the carry 166 from bit 13 are inputted to an overflow detection circuit 152 to perform addition 172 of the upper two bits of 16-bit addition of the augend and the addend 171 and overflow detection 174 in parallel to each other to achieve high rate overflow detection as shown in FIG. 21.

However, where the bit length n of the inputs is increased to a great length and the bit length m of the result is much shorter than n, the construction shown in FIG. 20 cannot be applied in fact since the circuit scale becomes excessively large.

In the circuit construction shown in FIG. 20, the number of input lines to the overflow detection circuit 152 is 5 bits, and the overflow detection circuit 152 is a combinational logic circuit which determines an overflow detection result of 1 bit for $2^5=32$ different inputs. Although the internal construction of the overflow detection circuit 152 is disclosed particularly in Japanese Patent Laid-Open Application No. Heisei 3-62124, if it is tried to realize the overflow detection circuit 152, for example, using a programmable logic array which is means for realizing a general purpose combinational logic circuit, the circuit scale can be realized sufficiently from the point of view of the number of input bits.

However, it is supposed here, for example, to multiply two signed values placed on 32-bit microprocessors registers of the 32-bit length and write back a result of the multiplication back into the register of the 32-bit length. In this instance, at the last stage of a partial product adder tree in the inside of the multiplier of the 32-bit microprocessor, when the result of addition of two values $a_0$ to $a_{63}$ and $b_0$ to $b_{63}$ of the 64-bit length of the augend and the addend exceeds a range in which it can be represented correctly by 32 bits, it must be determined that an overflow occurs. In this instance, if a construction similar to that shown in FIG. 20 is employed, a combinational logic circuit of 67-bit inputs (including the upper 33 bits $a_{31}$ to $a_{63}$ and $b_{31}$ to $b_{63}$ of the two input values and a carry of one bit produced from the 30th bit when they are added) is required as an overflow detection circuit. If it is tried to implement a combinational logic circuit having input lines of up to 67 bits using a programmable logic array, then the circuit scale becomes excessively large. Accordingly, such combination logic circuit is not practical.

SUMMARY OF THE INVENTION

It is an object of the present invention to provide a parallel addition overflow detection circuit wherein addition and detection of an overflow can be performed in parallel with a small circuit scale even where the number of input bits is very great because the input bit length n to an adder is great and the bit length m of a result of addition is considerably small comparing with n.

In order to attain the object described above, according to the present invention, an augend and an addend are each divided into an upper bit side and a lower bit side with respect to the boundary between the (m−1)th bit and the mth bit when it is an unsigned number but between the (m−2) bit and the (m−1) bit when it is a signed number. Then, the addition overflow detection circuit comprises an adder for adding the lower bit side bits of the augend and the addend, one or more fast adder-comparators for detecting that a result of addition of the upper bit side bits of the augend and the addend is equal to a certain aimed value, and a circuit for determining presence or absence of an overflow from a carry generated from the adder and an output or outputs of the fast adder-comparator or adder-comparators.

More particularly, according to an aspect of the present invention, there is provided an addition overflow detection circuit for detecting that a result of addition of unsigned numbers of the n bit length cannot be represented correctly with the m bit length and overflows, n and m being integers, n being equal to or greater than m, comprising an adder of the m or more bit length for adding the lower m bits of an augend of the n bit length and the lower m bits of an addend of the n bit length, a first fast adder-comparator for detecting that all bits of a result of addition of the upper n−m bits of the augend and the upper n−m bits of the addend are all equal to 1, a second fast adder-comparator for detecting that all bits of the result of addition of the upper n−m bits of the augend and the upper n−m bits of the addend are all equal to 0, and a selector for referring to a carry from the (m−1)th bit to the mth bit extracted from the adder to select and logically invert one of an all bit 1 detection output of the first fast adder-comparator and an all bit 0 detection output of the second fast adder-comparator and outputting a resulted value as an overflow detection result.

In the addition overflow detection circuit, addition of the lower m bits of the augend and the addend and fast addition-comparison for detecting that the result of addition of the upper n−m bits of the augend and the addend is equal to an aimed value can be performed in parallel to each other. Accordingly, an overflow detection result can be obtained after a very short delay required to determine presence or absence of an overflow from the carrier generated by the adder and the outputs of the fast adder-comparators after the result of addition is settled.

Accordingly, the addition overflow detection circuit is advantageous in that, by employing the fast adder-comparators, addition and detection of an overflow can be performed in parallel with a hardware scale which can be implemented readily.

According to another aspect of the present invention, there is provided an addition overflow detection circuit for detecting that a result of addition of unsigned binary numbers of the n bit length cannot be represented correctly with the m bit length and overflows, n and m being integers, n being equal to or greater than m, comprising an adder of the m or more bit length for adding the lower m bits of an augend of the n bit length and the lower m bits of an addend of the n bit length, a half adder for adding the mth bit of the augend and the mth bit of the addend, a fast adder-comparator for detecting that bits of a result of addition of the upper n−m−1 bits of the augend and the upper n−m−1 bits of the addend are equal to an output of the half adder, and an incoincidence detector for determining that the carry from the (m−1)th bit to the mth bit extracted from the adder and a coincidence detection output of the fast adder-comparator are not equal to each other and outputting a result of the determination as an overflow detection result.

In the addition overflow detection circuit, addition of the lower m bits of the augend and the addend and fast addition-comparison for detecting that the result of addition of the upper n−m−1 bits of the augend and the addend is equal to an aimed value can be performed in parallel. Accordingly, the addition overflow detection circuit is similarly advantageous in that an overflow detection result can be obtained after such a very short delay as described above and addition and detection of an overflow can be performed in parallel with a hardware scale which can be implemented readily. Besides, by using the half adder, the addition overflow detection circuit can be constructed using a single fast adder-comparator. Consequently, the addition overflow detection circuit is further advantageous in that the circuit scale is reduced.

According to a further aspect of the present invention, there is provided an addition overflow detection circuit for detecting that a result of addition of signed binary numbers of the n bit length cannot be represented correctly with the m bit length and overflows, n and m being integers, n being equal to or greater than m, comprising an adder of the m−1 or more bit length for adding the lower m−1 bits of an augend of the n bit length and the lower m−1 bits of an addend of the n bit length, a first fast adder-comparator for detecting that all bits of a result of addition of the upper n−m+1 bits of the augend and the upper n−m+1 bits of the addend are equal to 1 except the lowermost bit, a second fast adder-comparator for detecting that all bits of the result of addition of the upper n−m+1 bits of the augend and the upper n−m+1 bits of the addend are all equal to 1, a third fast adder-comparator for detecting that all bits of the result of addition of the upper n−m+1 bits of the augend and the upper n−m+1 bits of the addend are equal to 0, and a decoder for producing an overflow detection result from totalling 4 bits of a carry from the (m−2)th bit to the (m−1)th bit extracted from the adder, an output of the first fast adder-comparator, an output of the second fast adder-comparator and an output of the third fast adder-comparator.

In the addition overflow detection circuit, addition of the lower m−1 bits of the augend and the addend and fast addition-comparison for detecting that the result of addition of the upper n−m+1 bits of the augend and the addend is equal to an aimed value can be performed in parallel. Accordingly, the addition overflow detection circuit is similarly advantageous in that an overflow detection result can be obtained after such a very short delay as described above and addition and detection of an overflow can be performed in parallel with a hardware scale which can be implemented readily.

According to a still further aspect of the present invention, there is provided an addition overflow detection circuit for detecting that a result of addition of signed binary numbers of the n bit length cannot be represented correctly with the m bit length and overflows, n and m being integers, n being equal to or greater than m, comprising an adder of the m−1 or more bit length for adding the lower m−1 bits of an augend of the n bit length and the lower m−1 bits of an addend of the n bit length, a 2-bit adder for adding the (m−1)th and mth bits of the augend and the (m−1)th and mth bits of the addend, a first fast adder-comparator for detecting that all bits of a result of addition of the upper n−m−1 bits of the augend of the n bit length and the upper n−m−1 bits of the addend of the n bit length are all equal to 1, a second fast adder-comparator for detecting that all bits of the result of addition of the upper n−m−1 bits of the augend of the n bit length and the upper n−m−1 bits of the addend are all equal to 0, a selector for referring to the upper bit of a result of the addition of the 2-bit adder to select one of an all bit 1 detection output of the first fast adder-comparator and an all bit 0 detection output of the second fast adder-comparator, and a decoder for producing an overflow detection result from totalling 4 bits of a carry from the (m−2)th bit to the (m−1)th bit extracted from the adder, the upper bit and the lower bit of the result of the addition of the 2-bit adder and an output of the selector.

In the addition overflow detection circuit, addition of the lower m−1 bits of the augend and the addend and fast addition-comparison for detecting that the result of addition of the upper n−m−1 bits of the augend and the addend is equal to an aimed value can be performed in parallel. Accordingly, the addition overflow detection circuit is similarly advantageous in that an overflow detection result can be obtained after such a very short delay as described above and addition and detection of an overflow can be performed in parallel at a high rate with a hardware scale which can be realized readily. Besides, by using the half adder, the addition overflow detection circuit can be constructed using two fast adder-comparators. Consequently, the addition overflow detection circuit is further advantageous in that the circuit scale is reduced.

Where the first fast adder-comparator, the second fast adder-comparator and the selector are replaced by a single fast adder-comparator for detecting that all bits of a result of addition of the upper n−m−1 bits of the augend of the n bit length and the upper n−m−1 bits of the addend of the n bit length are equal to the upper bit of the result of the addition of the 2-bit adder, the number of fast adder-comparators is further reduced and the circuit scale is further reduced.

Where one of the first and second mentioned addition overflow detection circuits which handle unsigned numbers and one of the third, fourth and fifth mentioned addition overflow detection circuits which handle signed numbers, an addition overflow detection circuit which can handle both of unsigned numbers and signed numbers can be obtained.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a table illustrating requirements for addition of unsigned numbers not to cause an overflow;

FIG. 6 is a table illustrating requirements for addition of unsigned numbers not to cause an overflow in the addition overflow detection circuit of FIG. 5;

FIG. 9 is a table illustrating requirements for addition of unsigned numbers not to cause an overflow in the addition overflow detection circuit of FIG. 8;

FIG. 10 is a table of truth values which define input and output values of a decoder employed in the addition overflow detection circuit of FIG. 8;

FIG. 13 is a table illustrating requirements for addition of unsigned numbers not to cause an overflow;

FIG. 14 is a table of truth values which define relationships of input and output values of a decoder employed in the addition overflow detection circuit of FIG. 12;

FIG. 18 is a time chart illustrating operation of the addition overflow detection circuit of FIG. 18;

DESCRIPTION OF THE PREFERRED EMBODIMENTS

Figure 1:
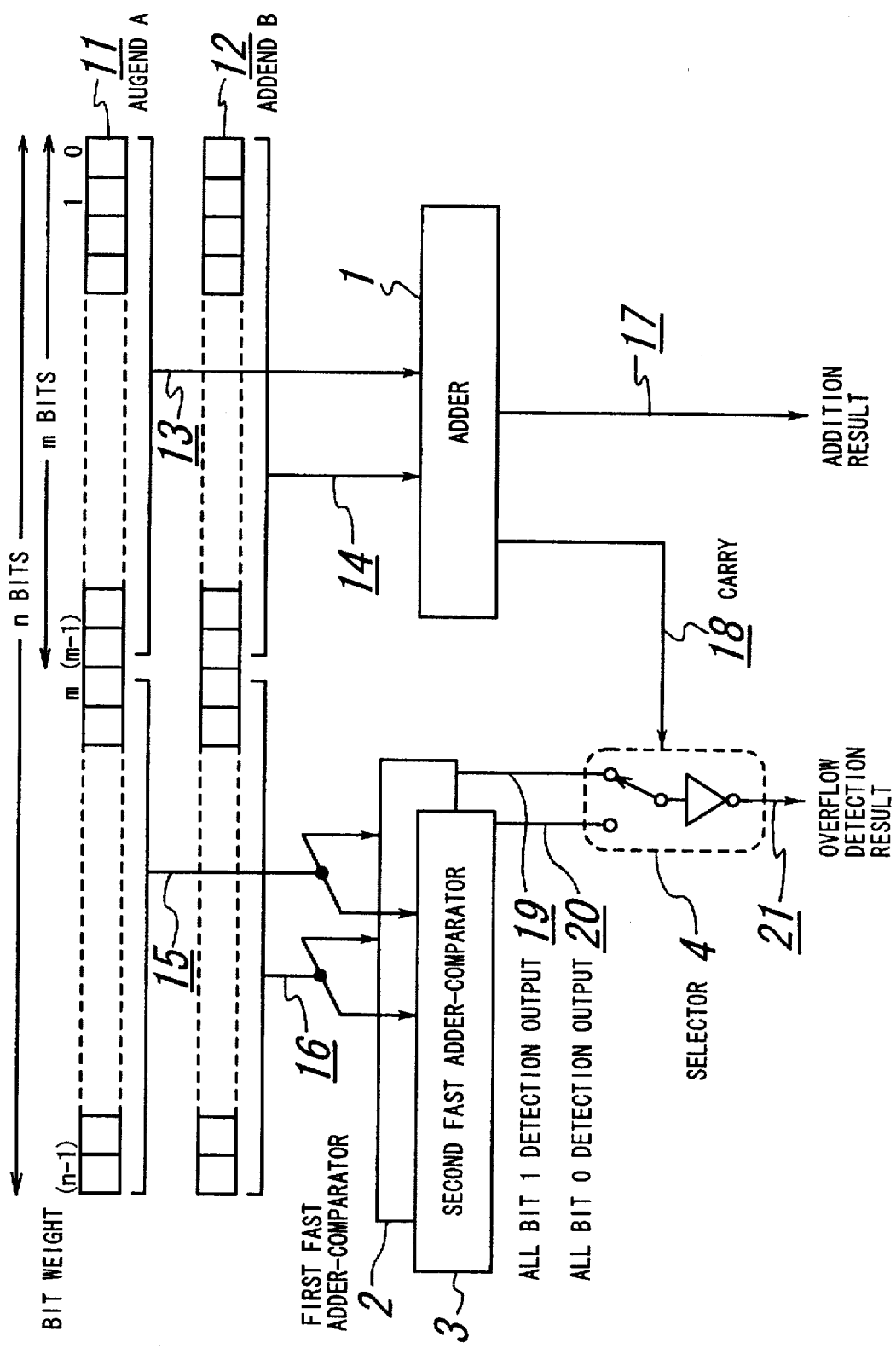
FIG. 1 is a block diagram of an addition overflow detection circuit which handles unsigned numbers showing a first preferred embodiment of the present invention.

Five different embodiments of the present invention are described below with reference to FIGS. 1 to 17. In the description, the definitions of addition of unsigned binary numbers and an overflow upon such addition are described first, and a construction of a fast adder-comparator which is employed in all of the five embodiments is described. Then, the first and second embodiments wherein an overflow of addition of unsigned numbers is detected are described. Finally, definitions of addition of signed binary numbers and an overflow upon such addition are described, and the third to fifth embodiments wherein an overflow of addition of of signed numbers is detected is described.

Before the first and second embodiments are described, addition of unsigned numbers and an overflow upon such addition are defined in the following manner. First, for the addition of unsigned numbers of the n-bit length, each bit of an augend A of the n-bit length is represented by "$a_i$" ($0 \leq i \leq n-1$), and each bit of an addend B is represented by "$b_i$" ($0 \leq i \leq n-1$). In this instance, the sum $S = s_i$ ($0 \leq i \leq n$) of the augend A and the addend B is defined by the following equation (1):

$$\sum_{i=0}^{n} s_i \cdot 2^i = \sum_{i=0}^{n-1} a_i \cdot 2^i + \sum_{i=0}^{n-1} b_i \cdot 2^i \tag{1}$$

In order to represent the sum of the augend A and the addend B without an overflow, the sum S has the n+1 bit length.

An overflow of addition of unsigned numbers is defined subsequently. If the bits of the sum S from the mth bit to the nth bit are all equal to zero, then if a bit string of the lower m bit length extracted from the sum S of the n+1 bit length is zero expanded to another string of the n+1 bit length again, it maintains its value. In other words, even if the sum S is represented by m bits, no overflow occurs. Therefore, the requirement for an overflow to occur is represented by the following equation (2):

$$ovf_{unsigned} = S_n \nabla S_{n-1} \nabla \ldots \nabla S_{m+1} \nabla S_m \tag{2}$$

where $\nabla$ represents logical ORing. Here, if $ovf_{unsigned}$ is true, then an overflow occurs.

Further, the sum $R = r_i$ ($m \leq i \leq n$) of the upper n−m bits of the augend A and the addend B is represented by the following equation (3):

$$\sum_{i=m}^{n} r_i \cdot 2^i = \sum_{i=m}^{n-1} a_i \cdot 2^i + \sum_{i=m}^{n-1} b_i \cdot 2^i \tag{3}$$

where R has the n−m+1 bit length.

$s_i$ defined by the equation (1) and $r_i$ defined by the equation (3) have a relationship represented by the following equation (4):

$$\sum_{i=m}^{n} s_i \cdot 2^i = \sum_{i=m}^{n} r_i \cdot 2^i + c_{m-1} \cdot 2^m \tag{4}$$

where $c_{m-1}$ is a carry from the ($c_{m-1}$)th bit to the $c_m$th bit when the augend A and the addend B are added entirely. In other words, addition of the carry from the $(c_{m-1})$th bit to the $c_m$ bit to $r_m$ to $r_n$ makes $s_m$ to $s_n$.

Next, a construction of a fast adder-comparator employed in all of the five embodiments is described. The fast adder-comparator is a circuit which determines it at a high rate without performing addition of two values whether or not the sum $r_i$ of the augend A and the addend B defined by the equation (3) is equal to a certain aimed value $K=k_i$ ($m \leq i \leq n$). The construction of the fast adder-comparator is disclosed in Cortadella and Llaberia, "Evaluation of A+B=K Conditions without Carry Propagation", *IEEE Transactions on Computers*, Vol. 41, No. 11, November, 1992, pp. 1484–1488 and is described below.

First, a propagation carry $p_i$ and a generation carry $g_i$ are defined by the following equations (5) and (6), respectively:

$$p_i = a_i * b_i, \ (m-1 \leq i \leq n-1) \quad (5)$$

$$g_i = a_i \Delta b_i, \ (m-1 \leq i \leq n-1) \quad (6)$$

where * is logical exclusive ORing, and $\Delta$ is logical ANDing.

The propagation carry $p_i$ indicates that, when a carry from the lower bit, that is, a carry from the (i−1)th bit to the ith bit, is generated, another carry from the ith bit to the (i+1)th bit is generated. The generation carry $g_i$ indicates that a carry from the ith bit to the (i+1)th bit is generated irrespective of presence or absence of a carry from the lower bit ((i−1)th bit).

Then, from the propagation carry $p_i$ and the generation carry $g_i$ represented by the equations (5) and (6), respectively, a required carry out $v_i$ and a required carry in $w_i$ are defined by the following equations (7) and (8), respectively:

$$v_i = (p_i \Delta k_i) \nabla g_i, \ (m-1 \leq i \leq n-1, \ v_{-1}=0) \quad (7)$$

$$w_i = p_{i+1} * k_{i+1}, \ (m-1 \leq i \leq n-1, \ P_n=0) \quad (8)$$

The required carry out $v_i$ indicates a carry which is generated from the ith bit to the upper bit ((i+1)th bit) when $k_i = r_i$ is assumed, and the required carry in $w_i$ indicates the requirement for $k_{i+1} = r_{i-1}$ to be satisfied for a carry from the ith bit. Accordingly, $z_i$ given by the following equation (9)

$$z_i = \overline{v_{i-1} * w_{i-1}}, \ (m \leq i \leq n) \quad (9)$$

is true when the ith bit $r_i$ of the result of addition and the ith bit $k_i$ of an aimed value are equal to each other, and the logical AND Z over all of the bits of the result of addition given by the following equation (10)

$$Z = z_n \Delta z_{n-1} \Delta \ldots \Delta z_m \quad (10)$$

is true when the sum R of the upper n−m+1 bits of the augend A and the addend B is equal to its aimed value K. The value Z is the output of the fast adder-comparator.

It is to be noted that $z_i$ given by the equation (9) above is generated referring only to the (i−1)th bit and the ith bit of the augend A and the addend B. In other words, $z_i$ can be generated after a fixed delay without depending upon the bit length n of the augend A and the addend B, and the output Z of the fast adder-comparator can be calculated at a high speed even if the bit length n increases.

The first embodiment of the present invention wherein an overflow of addition of unsigned numbers is detected is described below making use of the definitions of addition of unsigned numbers and an overflow and the operation of the fast adder-comparator described above.

The addition overflow detection circuit of the first embodiment of the present invention detects that the result of addition of unsigned binary numbers of the n bit length cannot be represented correctly with the m ($m \leq n$) bit length and overflows. The addition overflow detection circuit of the first embodiment is shown in FIG. 1. Referring to FIG. 1, the addition overflow detection circuit includes an adder 1 of the m or more bit length for adding the lower m bits 13 of an augend A 11 of the n bit length and the lower m bits 14 of an addend B 12 of the n bit length, a first fast adder-comparator 2 for detecting that the bits of the result of addition of the upper n−m bits 15 of the augend A 11 and the upper n−m bits 16 of the addend B 12 are all equal to 1, a second fast adder-comparator 3 for detecting that the bits of such result of addition are all equal to 0, and a selector 4 for referring to a carry 18 from the (m−1)th bit to the mth bit extracted from the adder 1 to select and logically invert one of an all bit 1 detection output 19 of the first fast adder-comparator 2 and an all bit 0 detection output 20 of the second fast adder-comparator 3 and outputting a resulted value as an overflow detection output 21.

In the addition overflow detection circuit of the first embodiment, at least the lower m bits of the augend A 11 and the addend B 12 of the n bit length are first inputted to the adder 1, and an addition result 17 and the carry 18 from the (m−1)th bit to the mth bit are extracted from the adder 1.

As seen from the equation (2), the result of addition of unsigned numbers does not overflow only when all of the mth to nth bits of the addition result S are equal to 0. This requirement is satisfied, according to the equation (4), in two cases of a requirement 2-1 and another requirement 2-2 illustrated in FIG. 2 depending upon presence or absence of the carry 18.

Therefore, the first fast adder-comparator 2 determines the requirement 2-1, that is, that all bits of the sum of the upper n−m bits 15 of the augend A 11 and the upper n−m bits 16 of the addend B 12 are equal to 1, or in other words, the equation (10) when $k_i = 1$ ($m \leq i \leq n$) in the equations (7) and (8). Meanwhile, the second fast adder-comparator 3 determines the requirement 2-2, that is, that all bits of the sum of the upper n−m bits 15 of the augend A 11 and the upper n−m bits 16 of the addend B 12 are equal to 0, or in other words, the equation (10) when $k_i = 0$ ($m \leq i \leq n$) in the equations (7) and (8). Then, when the carry 18 is 1, the output of the first fast adder-comparator 2 is selected, but when the carry is 0, the output of the second fast adder-comparator 3 is selected, and the thus selected output is logically inverted, by the selector 4. A resulted signal from the selector 4 is outputted as an overflow detection result 21. The output is true (1) when the result of addition of the augend A 11 and the addend B 12 of the n bit length cannot be represented with the m bit length and an overflow is generated.

Figure 3:
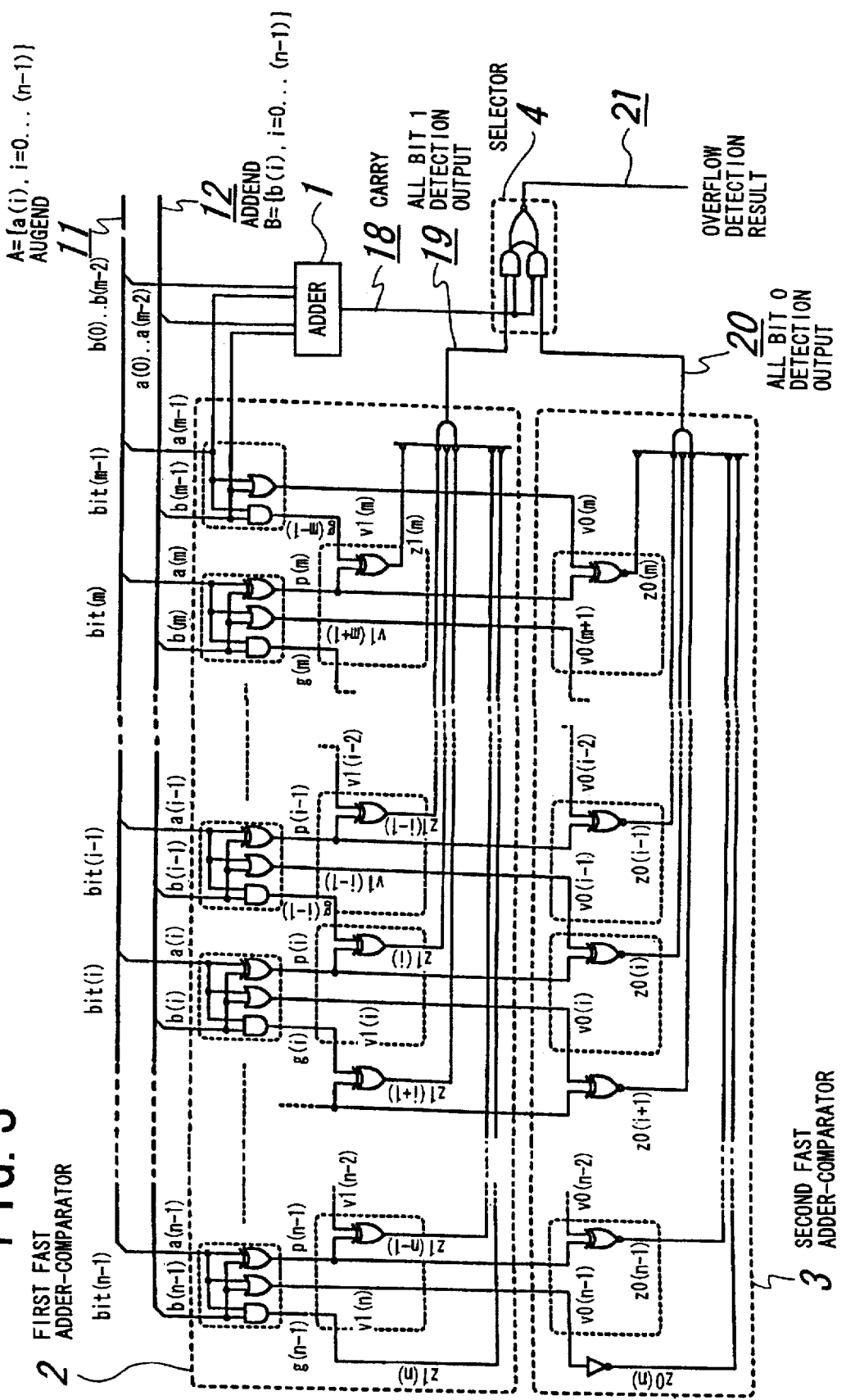
FIG. 3 is a circuit diagram showing an example of the addition overflow detection circuit of FIG. 1 where it is implemented using logic gates.

FIG. 3 shows an example wherein the first fast adder-comparator 2, the second fast adder-comparator 3 and the selector 4 employed by the addition overflow detection circuit of the first embodiment of FIG. 1 are implemented using logic gates.

The adder 1 is an ordinary carry propagation adder such as a carry lookahead adder or a carry select adder, and accordingly, the internal construction of the adder 1 is not defined particularly. Since the circuit shown in FIG. 3 includes two fast adder-comparators, in order to distinguish the values of internal nodes of them from each other, the value of the equation (9) of the first fast adder-comparator 2 is represented by $z1_i$, and the values of the equations (7) and (9) of the second fast adder-comparator 3 are represented by $v0_i$ and $z0_i$, respectively.

The value of $v0_i$ is given, by substituting $k_i=0$ into the equation (7), by $$v_i = a_i \nabla b_i \quad (11)$$

Therefore, the value $v_i$ is produced using an OR gate in FIG. 3. The OR-gated signal may possibly be taken out from the inside of an EXOR gate for the generation of $p_i$ together with an AND-gated signal for the generation of $g_i$, resulting in simplification of the circuitry.

Figure 4:
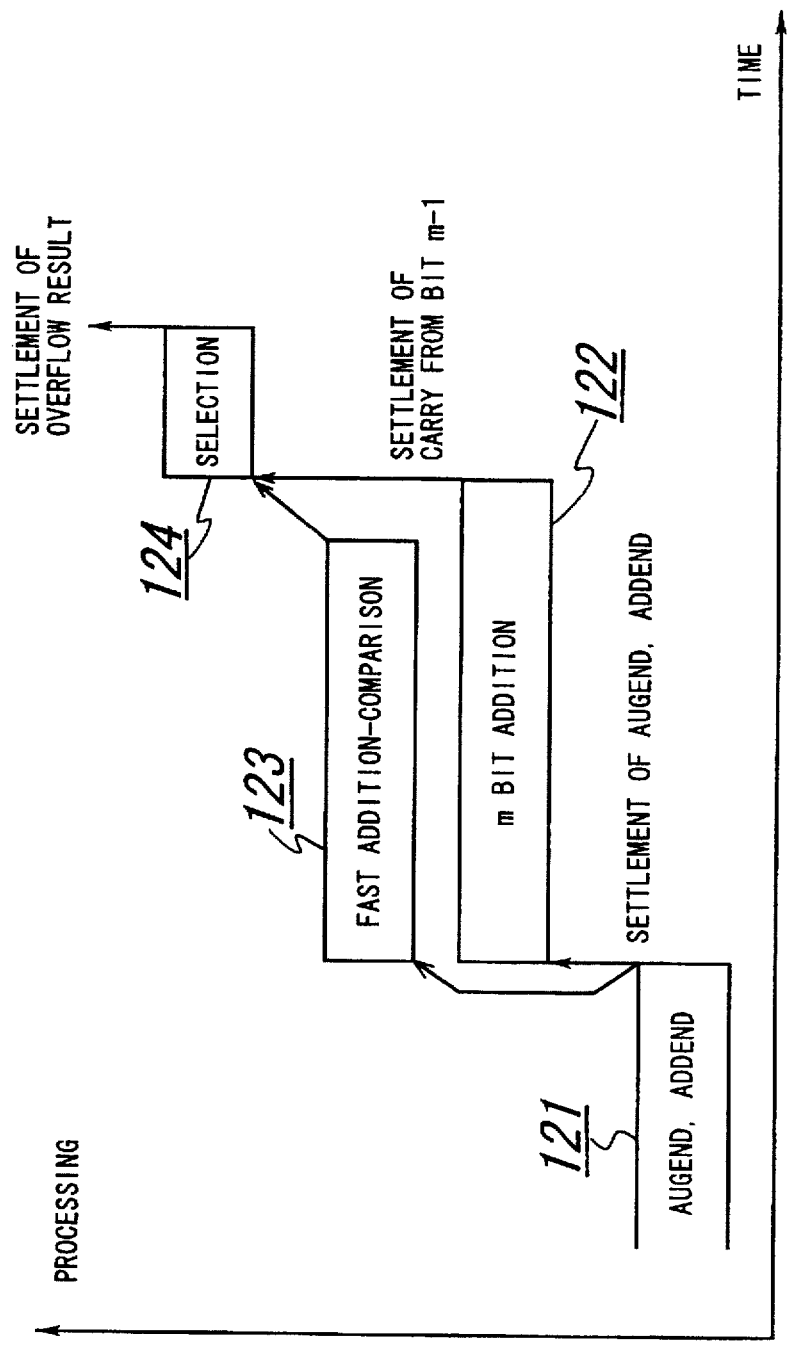
FIG. 4 is a time chart illustrating operation of the addition overflow detection circuit shown in FIG. 1.
Figure 19:
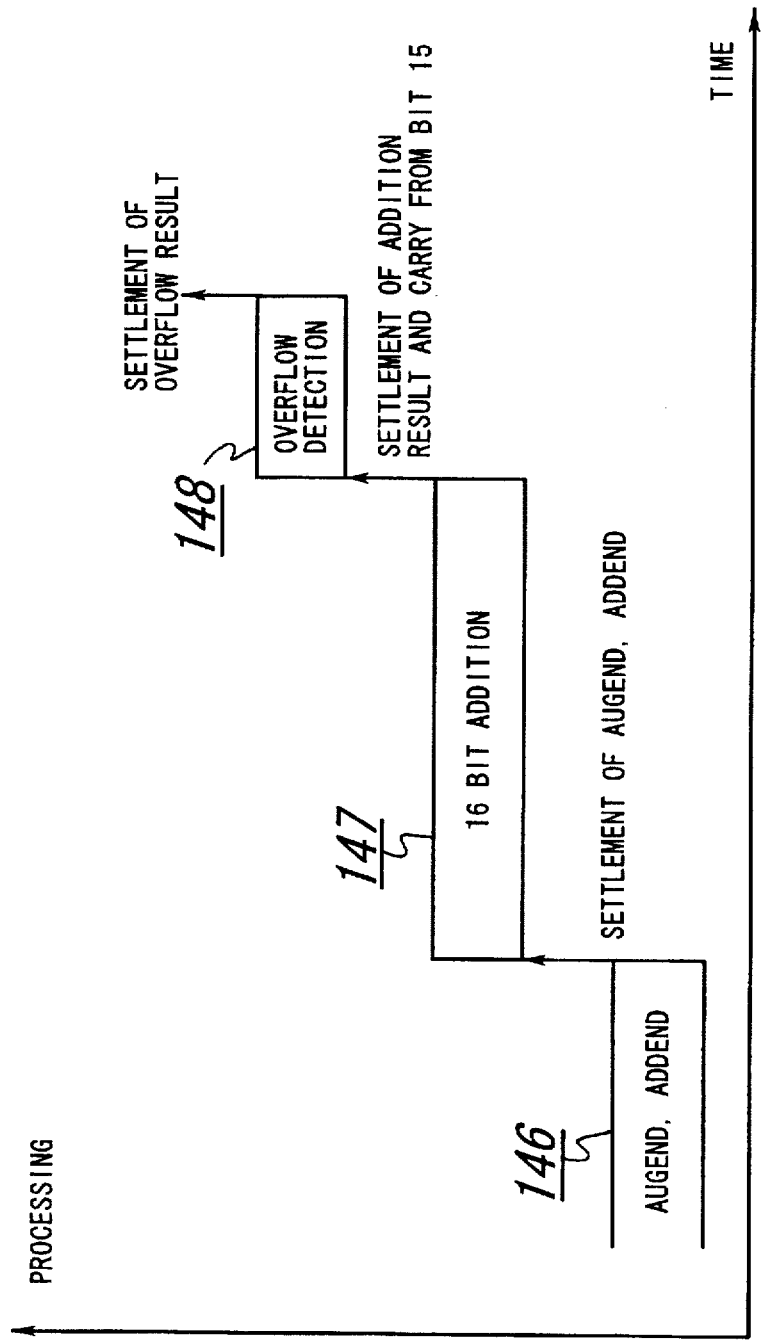
Figure 20:
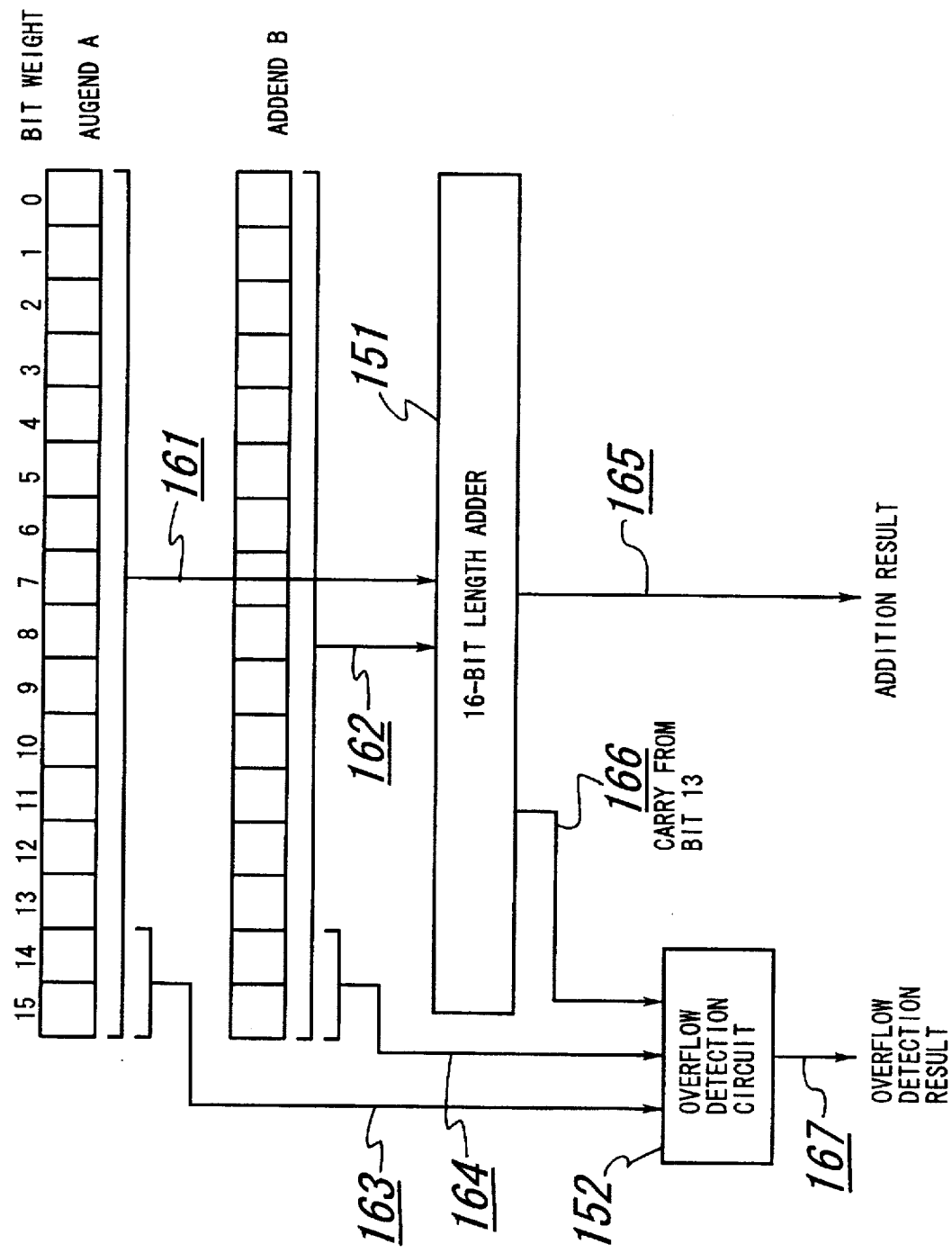
FIG. 20 is a block diagram showing another conventional addition overflow detection circuit.
Figure 21:
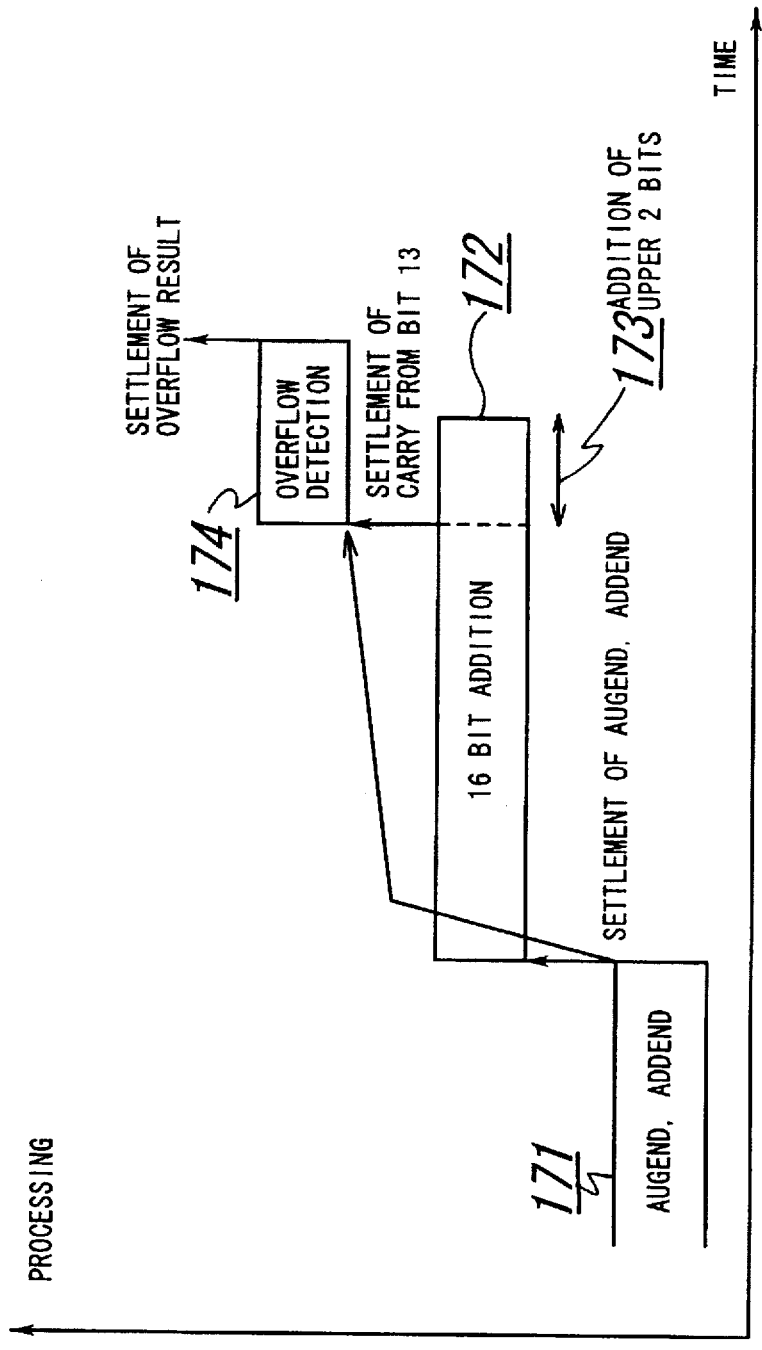
FIG. 21 is a time chart illustrating operation of the addition overflow detection circuit of FIG. 20.

A time chart illustrating operation of the addition overflow detection circuit of the first embodiment is shown in FIG. 4. With the addition overflow detection circuit of the first embodiment, since an m-bit length addition process 122 of an augend and an addend 121 and a fast addition comparison process 123 can be performed parallelly, detection of an overflow can be performed faster than the conventional addition overflow detection circuits wherein addition processing and most of overflow detection processing are performed in series as shown in FIGS. 19 and 21. It is to be noted that reference numeral 124 in FIG. 4 denotes a selection process of the selector 4.

Figure 5:
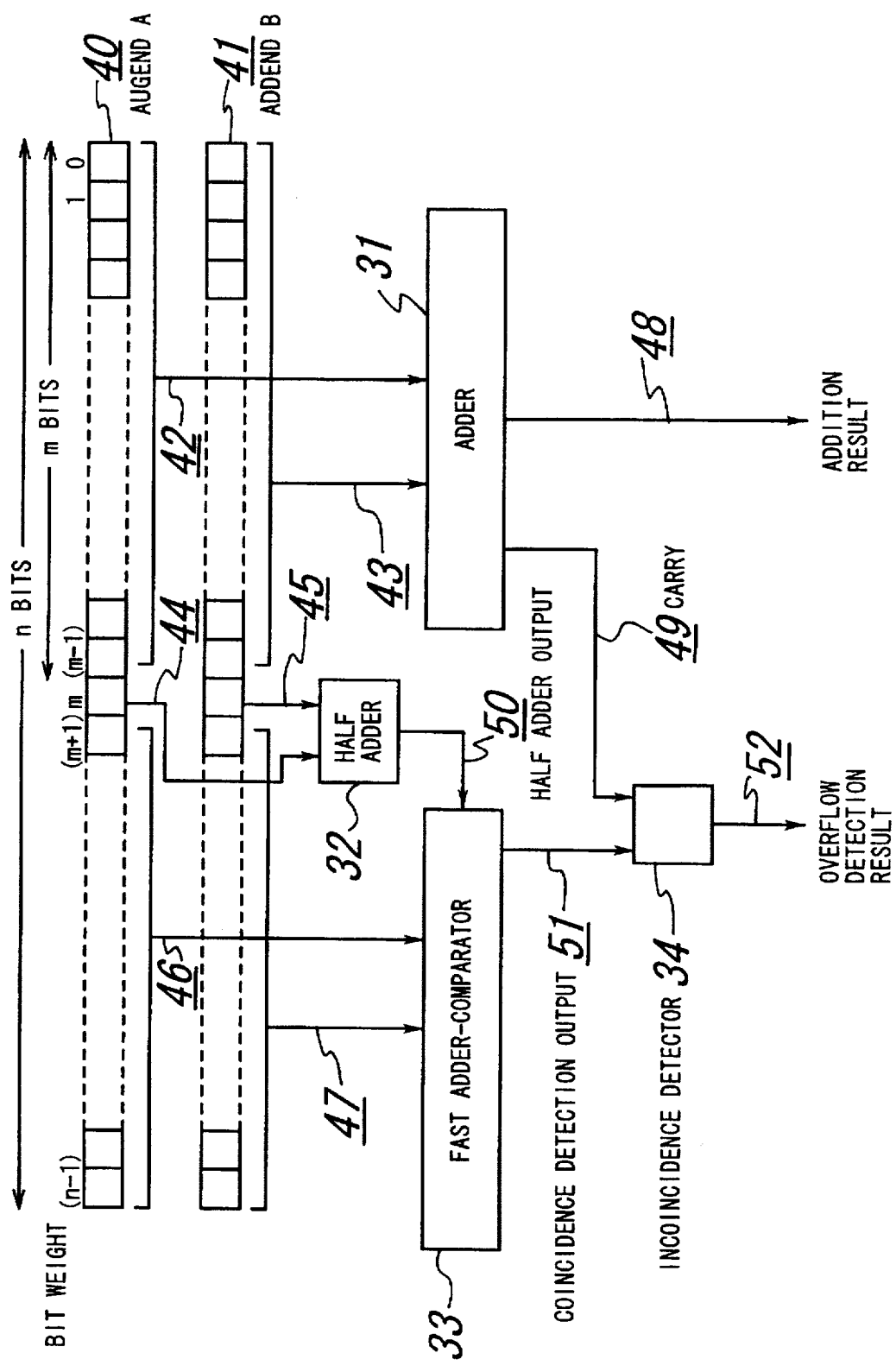
FIG. 5 is a block diagram of another addition overflow detection circuit which handles unsigned numbers showing a second preferred embodiment of the present invention.
Figure 7:
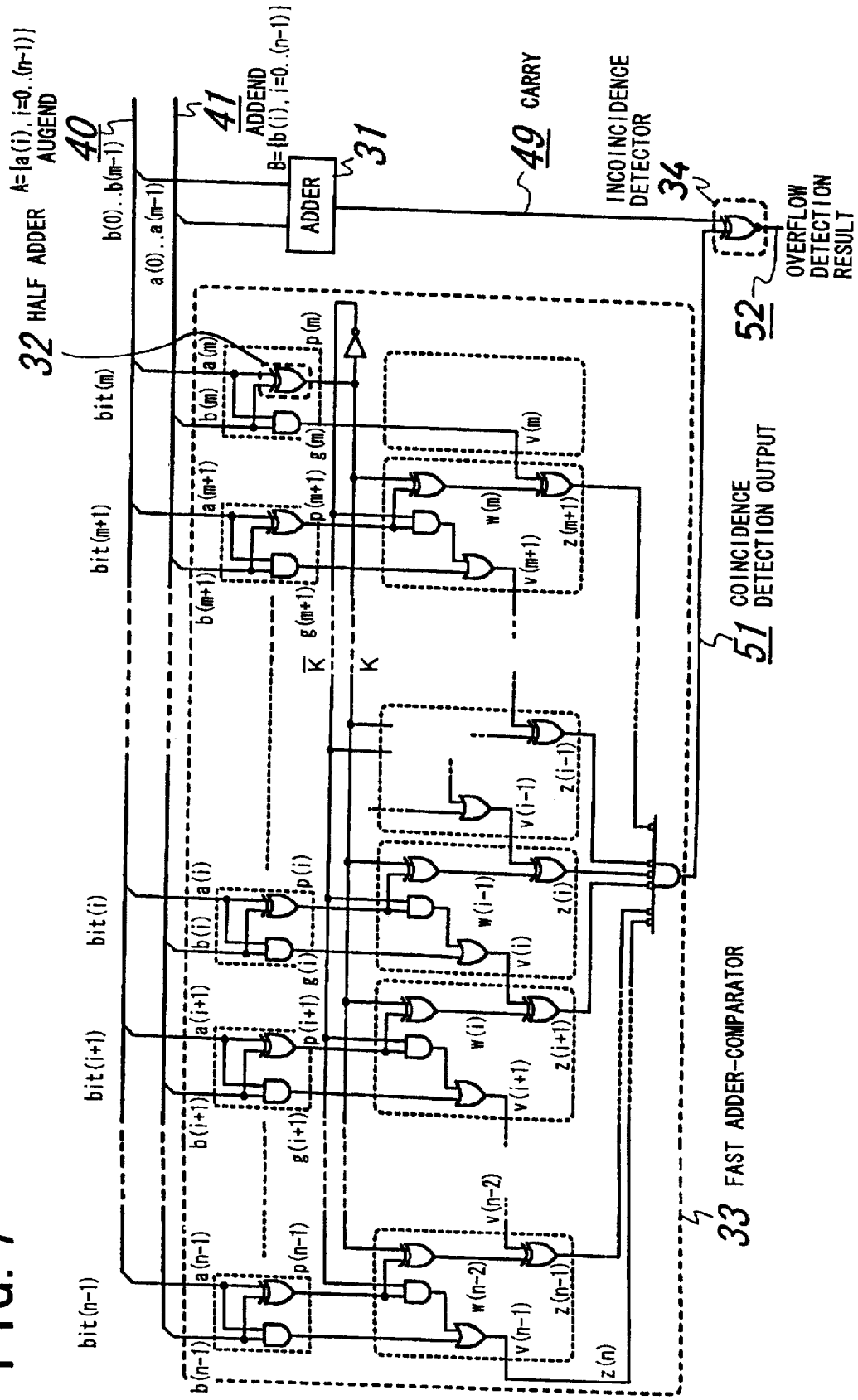
FIG. 7 is a circuit diagram showing an example of the addition overflow detection circuit of FIG. 5 where it is implemented using logic gates.

The addition overflow detection circuit of the second embodiment is shown FIGS. 5 to 7. Also the addition overflow detection circuit of the present embodiment detects that the result of addition of unsigned numbers of the n bit length cannot be represented correctly with the m (m≦n) bit length and an overflow is generated. Referring first to FIG. 5, the addition overflow detection circuit includes an adder 31 of the m or more bit length for adding the lower m bits 42 of an augend A 40 of the n bit length and the lower m bits 43 of an addend B 41 of the n bit length, a half adder 32 for adding the mth bit 44 of the augend A 40 and the mth bit 45 of the addend B 41, a fast adder-comparator 33 for detecting that all bits of the result of addition of the upper n−m−1 bits 46 of the augend A 40 and the upper n−m−1 bits 47 of the addend B 41 are equal to the output 50 of the half adder 32, and an incoincidence detector 34 for determining that the carry 49 from the (m−1)th bit to the mth bit extracted from the adder 31 and a coincidence detection output 51 of the fast adder-comparator 33 are not equal to each other and outputting a result of the determination as an overflow detection output 52.

Operation of the addition overflow detection circuit of the second embodiment is described below with reference to FIGS. 5 to 7.

The equation (4) is re-written to separate the term of $r_m$ as given by the following equation (12):

$$\sum_{i=m}^{n} s_i \cdot 2^i = \sum_{i=m+1}^{n} r_i \cdot 2^i + r_m \cdot 2^m + c_{m-1} \cdot 2^m \quad (12)$$

As seen from the equation (2), the result of addition of unsigned numbers does not overflow only when all of the mth to nth bits of the addition result S are equal to 0 as described hereinabove. Here, all possible combinations of the terms on the right side of the equation (12) which satisfy the requirement just described similarly as in FIG. 2 are two requirements 6-1 and 6-2 illustrated in FIG. 6.

According to FIG. 6, if $r_m$, that is, the half adder output 50 of the mth bit, is referred to, then it can be determined to which one of the requirements 6-1 and 6-2 the combination of the augend A 40 and the addend B 41 inputted to the overflow detection circuit may possibly correspond. Accordingly, if the half adder output 50 of the mth bit is 0, then $k_i$ is set to $k_i=0$, but if the half adder output 50 is 1, then $k_i$ is set to $k_i=1$, and in this condition, the fast adder-comparator 33 defined by the equations (5) to (10) is rendered operative. Thus, it can be determined from the coincidence detection output 51 of the fast adder-comparator 33 and the carry 31 from the (m−1)th bit to the mth bit obtained from the adder 31 whether any of the requirements of FIG. 6 is satisfied or none of the requirements is satisfied and an overflow occurs. In particular, if the values of the carry 49 and the coincidence detection output 51 coincide with each other, then the incoincidence detector 34 determines that no overflow occurs and outputs false, but if they do not coincide with each other, then the incoincidence detector 34 determines that an overflow occurs and outputs true, as the overflow detection output 52.

Here, the value $r_m$ can be calculated at a high rate by a single half adder, that is, a single EXOR (exclusive OR) gate, different from the value $c_{m-1}$ which must be calculated by carry propagation addition of the m bit length. Consequently, the fast adder-comparator 33 can most operate parallelly with the adder 31. Accordingly, with the addition overflow detection circuit of the second embodiment described above, although it involves a single fast adder-comparator and is simplified in circuit construction while the addition overflow detection circuit of the first embodiment includes two fast adder-comparators, the overflow detection result 52 can be generated fast at a substantially equal rate to that of the addition overflow detection circuit of the first embodiment.

FIG. 7 shows an example wherein the half adder 32, the fast adder-comparator 33 and the incoincidence detector 34 employed in the addition detection circuit of the second embodiment of FIG. 5 are realized using logic gates. Since the adder 31 is an ordinary carry propagation adder such as a carry lookahead adder or a carry select adder, the internal construction of the adder 31 is not defined particularly.

Subsequently, prior to description of the third to fifth embodiments of the present invention, addition of signed binary numbers and an overflow are described.

In the third to fifth embodiments, a two's complement is used to represent a negative number. The processing of adding signed binary numbers A and B of the n bit length represented by two's complements to obtain the sum S of the n+1 bit length can be performed by a circuit which performs addition of unsigned numbers of the equal n bit length. The addition overflow detection circuit detects that the addition result S of the n+1 bit length obtained cannot be represented correctly with the m bit length and an overflow is generated.

However, the definition of an overflow of addition of signed numbers is different as described below. In particular, if the (m−1)th to nth bits of the sum S are all equal to 0 or 1, then even if a string of bits of the lower m bit lengths extracted from the sum S of the n+1 bit length is sign expanded to the n+1 bit length again, it does not exhibit any change in value. In other words, if the sum S is represented by m bits, no overflow is generated. On the contrary, the requirement for an overflow to be generated is the negation of the requirement just described and is represented by the following equation (13):

$$ovf_{signed} = (s_n \nabla s_{n-1} \nabla \ldots \nabla s_m \nabla s_{m-1}) \Delta s_n \Delta s_{n-1} \ldots \Delta s_m s_{m-1}) \quad (13)$$

Here, if $ovf_{signed}$ is true, this indicates that an overflow is generated.

Further, for the convenience of description, similarly to R defined by the equation (3), the sum $Q=q_i$ (m−1≦i≦n) of the upper n−m+1 bits of the augend A and the addend B is defined by the following equation (14):

$$\sum_{i=m-1}^{n} q_i \cdot 2^i = \sum_{i=m-1}^{n-1} a_i \cdot 2^i + \sum_{i=m-1}^{n-1} b_i \cdot 2^i \qquad (14)$$

$s_i$ defined by the equation (1) and $q_i$ defined by the equation (14) have a relationship defined by the following equation (15):

$$\sum_{i=m-1}^{n} s_i \cdot 2^i = \sum_{i=m-1}^{n} q_i \cdot 2^i + c_{m-1} \cdot 2^{m-1} \qquad (15)$$

where $c_{m-2}$ is a carry from the $(c_{m-2})$th bit to the $(c_{m-1})$th bit when the augend A and the added B are added entirely. In other words, if the carry from the $(c_{m-2})$th bit to the $(c_{m-1})$th bit is added to $q_{m-1}$ to $q_n$, then the sum becomes equal to $s_{m-1}$ to $s_n$.

Operation of the addition overflow detection circuit of the third embodiment of the present invention wherein an overflow of addition of signed numbers is detected is described below with reference to FIGS. 8 to 11 making use of the definitions of addition of signed numbers and an overflow and the operation of the fast adder-comparator described above.

Figure 8:
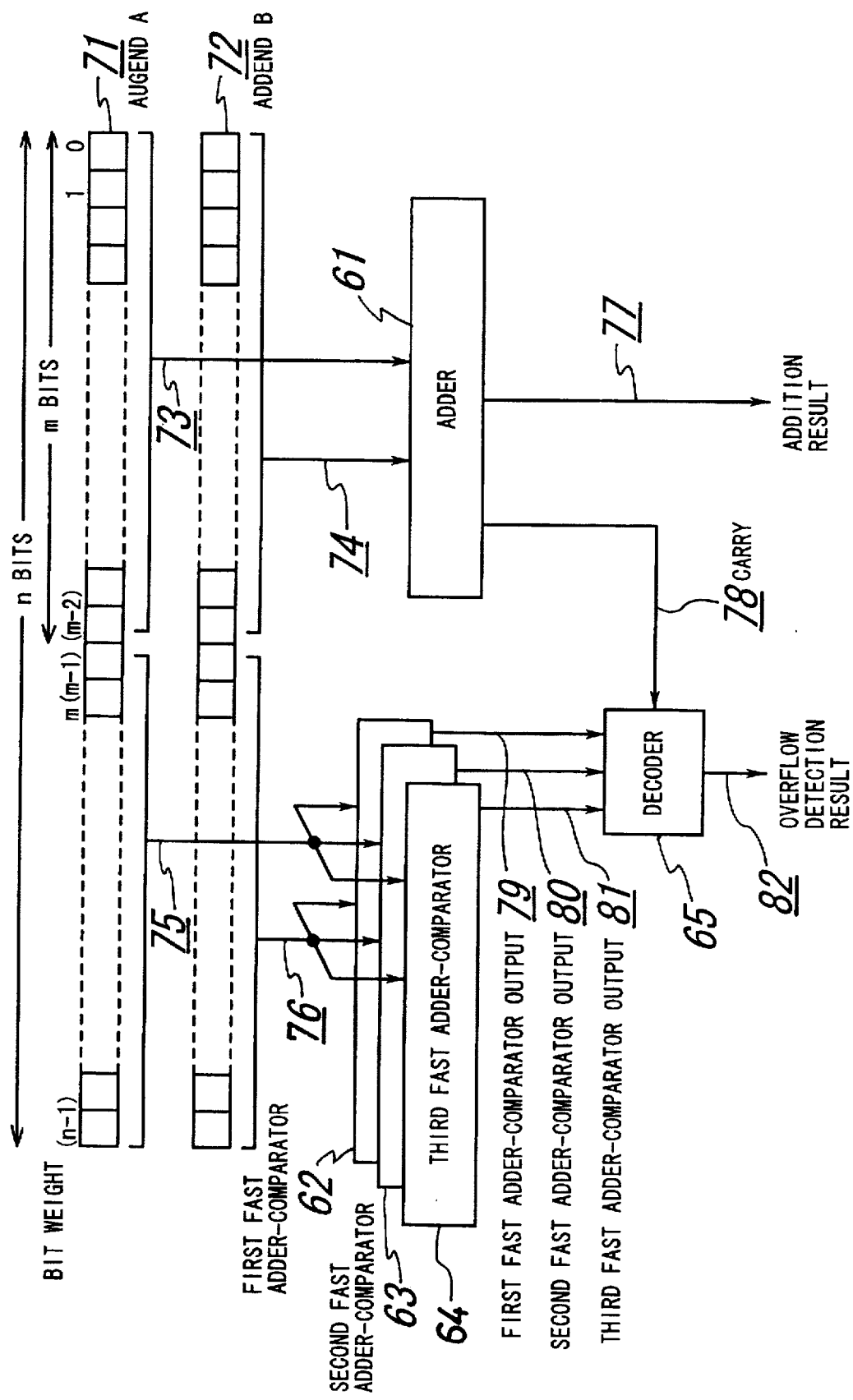
FIG. 8 is a block diagram of a further addition overflow detection circuit which handles signed numbers showing a third preferred embodiment of the present invention.

Referring to FIG. 8, in order to detect that a result of addition of signed numbers of the n bit length cannot be represented correctly with the m bit length (m≦n) and an overflow is generated, the addition overflow detection circuit of the third embodiment of the present invention includes an adder 61 of the m−1 or more bit length for adding the lower m−1 bits 73 of an augend A 71 of the n bit length and the lower m−1 bits 74 of an addend B 72 of the n bit length, a first fast adder-comparator 62 for detecting that the bits of the result of addition of the upper n−m+1 bits 75 of the augend A 71 and the upper n−m+1 bits 76 of the addend B 72 are all equal to 1 except the lowermost bit, a second fast adder-comparator 63 for detecting that the bits of the result of such addition are all equal to 1, a third fast adder-comparator 64 for detecting that the bits of the result of such addition are all equal to 0, and a decoder 65 for producing an overflow detection result from totalling 4 bits of a carry 78 from the (m−2)th bit to the (m−1)th bit extracted from the adder 61, the output 79 of the first fast adder-comparator 62, the output 80 of the second fast adder-comparator 63 and the output 81 of the third fast adder-comparator 64.

In the addition overflow detection circuit of the third embodiment, at least the lower m−1 bits of the augend A 71 and the addend B 72 of the n bit length are inputted to the adder 61, and an addition result 77 and a carry 78 from the (m−2)th bit to the (m−1)th bit are extracted from the adder 61.

As seen from the equation (13), the result of addition of signed numbers does not overflow when the (m−1)th to nth bits of the addition result are all equal to 0 or all equal to 1. The requirement is satisfied, according to the equation (15), when one of three requirements 9-1, 9-2 and 9-3 illustrated in FIG. 9 is satisfied depending upon the value of $q_{m-1}$ to $q_n$ and presence or absence of the carry 78. Here, the requirement 9-2 is a logical compression of two requirements wherein $q_n$ to $q_{m-1}$ are same but $c_{m-2}$ is different between them.

Thus, the first fast adder-comparator 62 determines $q_i$ corresponding to the requirement 9-1, that is, that the bits of the sum $q_i$ of the upper n−m+1 bits 75 of the augend A 71 and the upper n−m+1 bits 76 of the addend B 72 are all equal to 1 except the lowermost bit which is equal to 0, or in other words, the equation (10) when $k_{m-1}=0$ and $k_i=1$ (m≦i≦n) in the equations (7) and (8), and produces a first comparator output 79. The second fast adder-comparator 63 determines the requirement 9-2, that is, that the bits of the sum $q_i$ of the upper n−m+1 bits 75 of the augend A 71 and the upper n−m+1 bits 76 of the addend B 72 are all equal to 1, or in other words, the equation (10) when $k_i=1$ (m−1≦i≦n) in the equations (7) and (8), and produces a second comparator output 80. The third fast adder-comparator 64 determines $q_i$ corresponding to the requirement 9-3, that is, that the bits of the sum $q_i$ of the upper n−m+1 bits 75 of the augend A 71 and the upper n−m+1 bits 76 of the addend B 72 are all equal to 0, or in other words, the equation (10) when $k_i=0$ (m−1≦i≦n) in the equations (7) and (8), and produces a third comparator output 81.

The decoder 65 is a combinational circuit having a truth table shown in FIG. 10 and refers to the carry 78 from the (m−2)th bit to the (m−1)th bit when the augend A 71 and the addend B 72 are added and the comparator outputs 79, 80 and 81 of the first, second and third fast adder-comparator 62, 63 and 64, respectively, to determine that an overflow is not generated and output false as an overflow detection result 82 only in one of three cases described below wherein the requirements illustrated in FIG. 9 are satisfied, but to determine, in any other case, that an overflow is generated and output true as the overflow detection result 82. An overflow is not generated in the three cases including a case wherein the output 79 of the first fast adder-comparator 62 is true and the carry 78 is true and besides the requirement 9-2 is satisfied, another case wherein the output 80 of the second fast adder-comparator 63 is true and the requirement 9-2 is satisfied, and a further case wherein the output 81 of the third fast adder-comparator 64 is true and the carry 78 is false and besides the requirement 9-3 is satisfied. Since any plurality of ones of the adder-comparators do not output true at a time at all, the output of the decoder 65 need not be defined for this condition.

Figure 11:
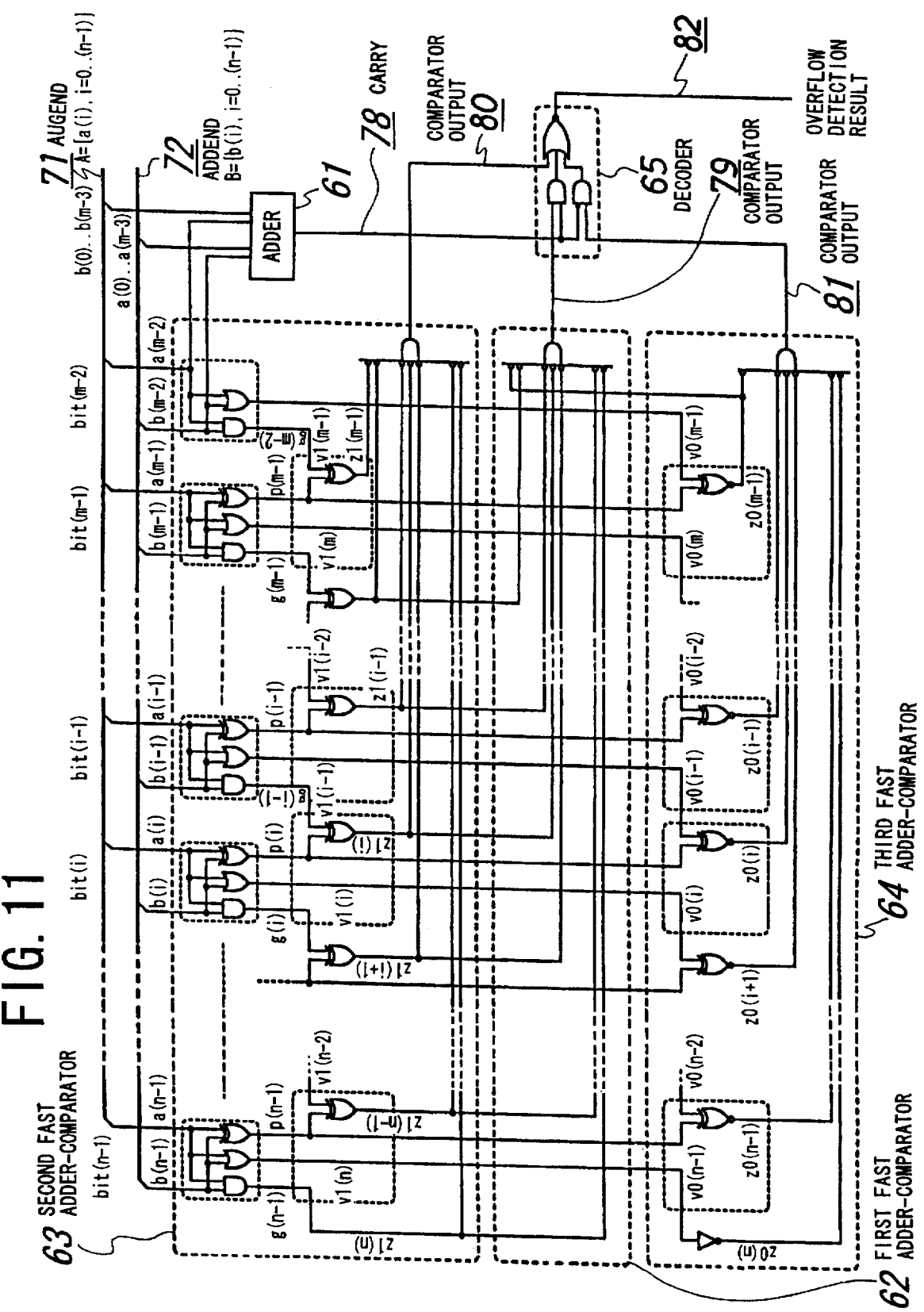
FIG. 11 is a circuit diagram showing an example of the addition overflow detection circuit of FIG. 8 where it is realized using logic gates.
Figure 12:
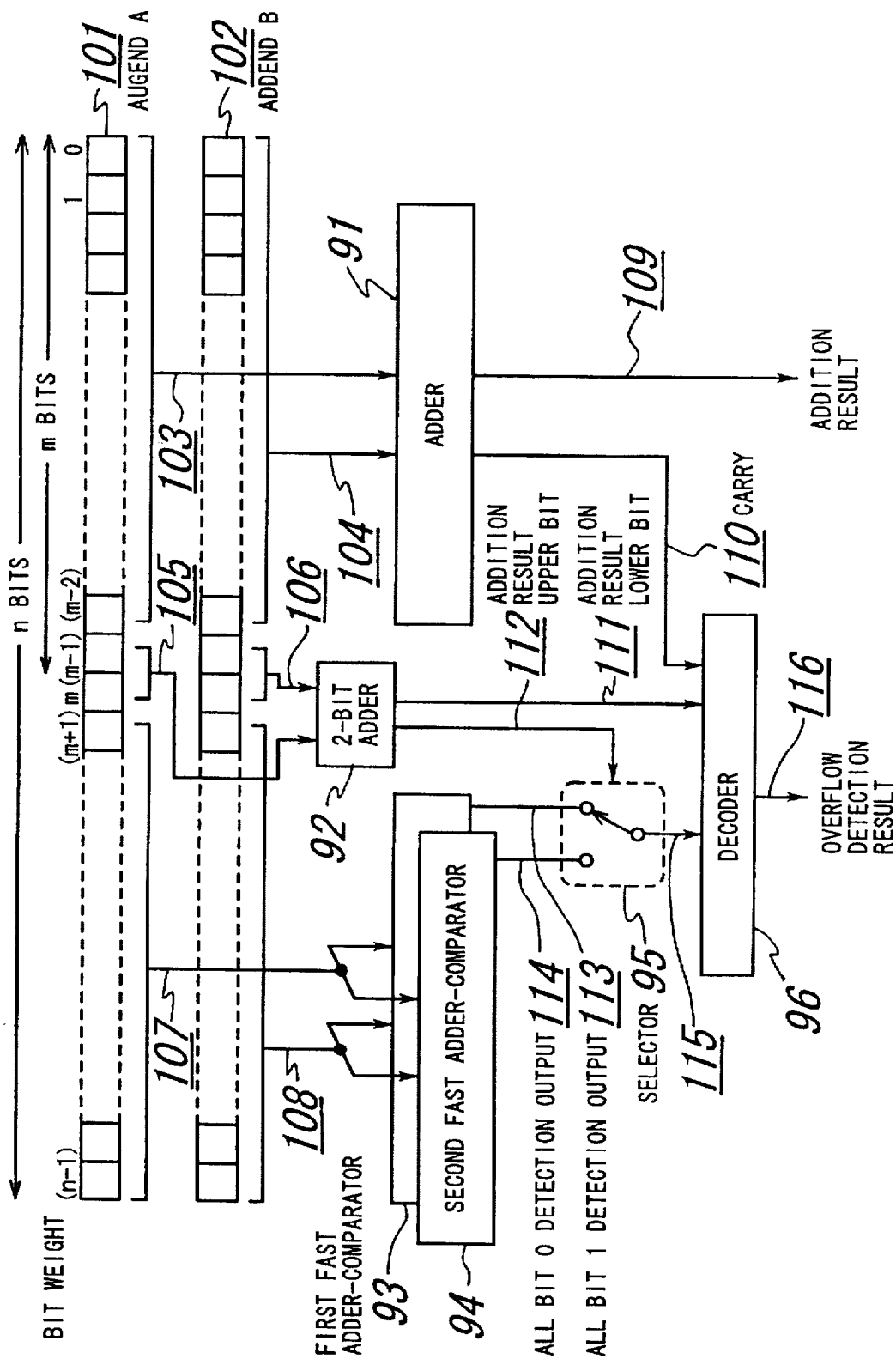
FIG. 12 is a block diagram of a still further addition overflow detection circuit which handles signed numbers showing a fourth preferred embodiment of the present invention.

FIG. 11 shows an example wherein the first fast adder-comparator 62, the second fast adder-comparator 63, the third fast adder-comparator 64 and the decoder 65 employed in the addition detection circuit of the third embodiment of FIG. 8 are implemented using logic gates. Since the adder 61 is an ordinary carry propagation adder such as a carry lookahead adder or a carry select adder, the internal construction of the adder 61 is not defined particularly.

Subsequently, the addition overflow detection circuit of the fourth preferred embodiment of the present invention wherein an overflow of addition of signed numbers is performed is described with reference to FIGS. 12 to 15.

The addition overflow detection circuit of the fourth embodiment of the present invention detects that a result of addition of signed numbers of the n bit length cannot be represented correctly with the m (m≦n) bit length and an overflow is generated. To this end, the addition overflow detection circuit includes an adder 91 of the m−1 or more bit length for adding the lower m−1 bits 103 of an augend A 101 of the n bit length and the lower m−1 bits 104 of an addend B 102 of the n bit length, a 2-bit adder 92 for adding the m−1th and mth bits of the augend A 101 and the m−1th and mth bits of the addend B 102, a first fast adder-comparator 93 for detecting that the bits of the result of addition of the upper n−m−1 bits 107 of the augend A 101 of the n bit length and the upper n−m−1 bits 108 of the addend B 102 of the n bit length are all equal to 1, a second fast adder-comparator 94 for detecting that the bits of the result of such addition are all equal to 0, a selector 95 for referring to an addition result upper bit 112 of the 2-bit adder 92 to select one of the output 113 of the first fast adder-comparator 93 and the output 114 of the second fast adder-comparator 94, and a decoder 96 for producing an overflow detection result 116 from totalling four bits of a carry 110 from the (m−2)th bit to the (m−1)th bit extracted from the adder 91, the lower bit 111 and the lower bit 112 of the addition result of the 2-bit adder 92, and the output 115 of the selector 95.

In the addition overflow detection circuit of the fourth embodiment, the lower m−1 bits 103 of the augend A 101 of the n bit length and the lower m−1 bits 104 of the addend B 102 of the n bit length are inputted to the adder 91, and an addition result 109 and a carry 110 from the (m−2)th bit to the (m−1)th bit are extracted from the adder 91.

Then, the equation (15) is re-written, separating the terms of $q_m$ and $q_{m-1}$ from each other, into the following equation (16):

$$\sum_{i=m-1}^{n} s_i \cdot 2^i = \sum_{i=m+1}^{n} q_i \cdot 2^i + q_m \cdot 2^m + \qquad (16)$$

$$q_{m-1} \cdot 2^{m-1} + c_{m-2} \cdot 2^{m-1}$$

As seen from the equation (13), the result of addition of signed numbers does not overflow only when all of the (m−1)th to nth bits of the addition result S are equal to 0 or 1 as described hereinabove. Here, all possible combinations of the terms on the right side of the equation (16) which satisfy the requirement just described similarly as in FIG. 9 are two requirements 12-1 and 12-2 illustrated in FIG. 13.

According to FIG. 13, by referring to $q_m$, that is, the upper bit 112 of the result of addition of the (m−1)th bit and the mth bit, it can be determined whether there is the possibility that the combination of the augend A 101 and the addend B 102 inputted to the overflow detection circuit may correspond to one of the requirements 12-1 and 12-2. Accordingly, if the addition result upper bit 112 is 0, then $k_j$ is set to $k_j=0$, but if the addition result upper bit 112 is 1, then $k_j$ is set to $k_j=1$ (in both cases, m+1≦i≦n), and results of fast addition comparison defined by the equations (5) to (10) performed in this condition are required. Therefore, for the second fast adder-comparator 94, $k_j$ is set to $k_j=1$ so that the first fast adder-comparator 93 may produce an all bit 1 detection output 113, and for the second fast adder-comparator 94, $k_j$ is set to $k_j=0$ so that the second fast adder-comparator 94 may output an all bit zero detection output 114. Then, when the upper bit 112 is 1, the all bit 1 detection output 113 is selected, but when the upper bit 112 is 0, the all bit 0 detection output 114 is selected, by the selector 95, and the selected output of the selector 95 is outputted as a selector output 115. Consequently, from FIG. 12, an overflow detection output 116 can be produced from totalling 4 bits of the carry 109, the upper bit 112 and the lower bit 111 of the addition result of the 2-bit adder 92 and the output 115 of the selector 95 using the decoder 96 having the truth table shown in FIG. 14.

Figure 15:
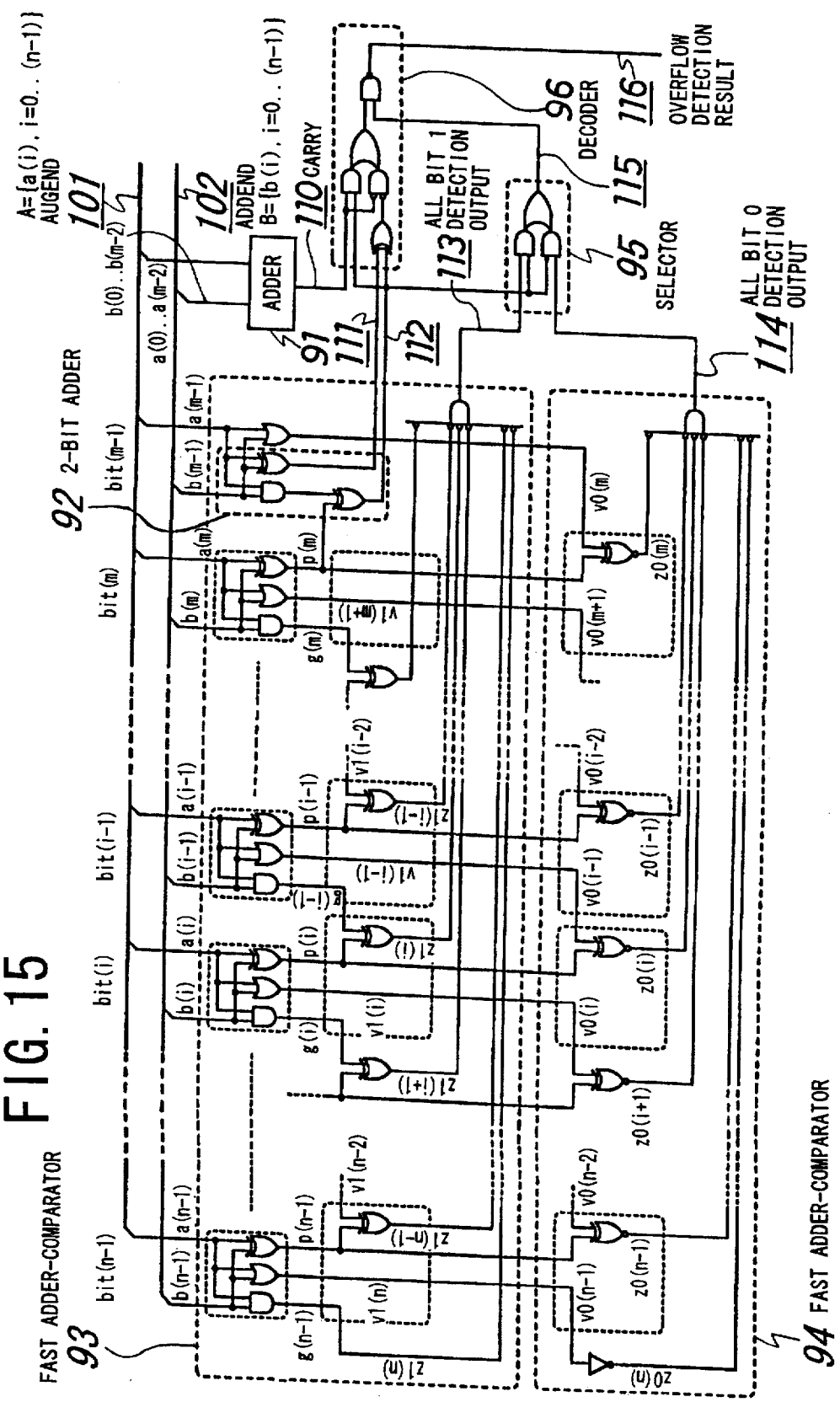
FIG. 15 is a block diagram showing an example of the addition overflow detection circuit of FIG. 12 where it is realized using logic gates.

FIG. 15 shows an example wherein the 2-bit adder 92, the first fast adder-comparator 93, the second fast adder-comparator 94, the selector 95 and the decoder 96 employed in the addition detection circuit of the fourth embodiment of FIG. 13 are implemented using logic gates. Since the adder 91 is an ordinary carry propagation adder such as a carry lookahead adder or a carry select adder, the internal construction of the adder 91 is not defined particularly.

Figure 16:
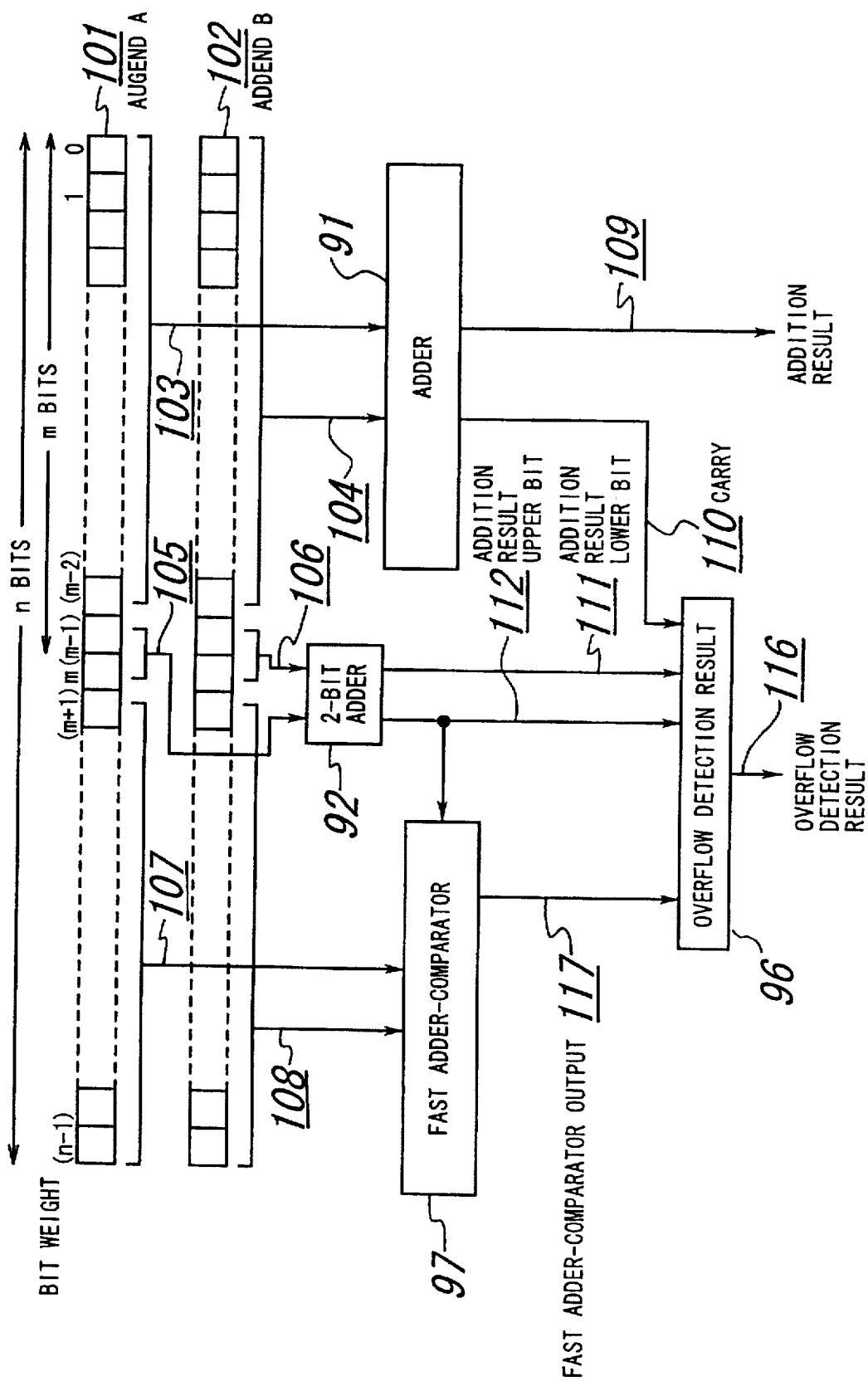
FIG. 16 is a block diagram of a yet further addition overflow detection circuit which handles signed numbers showing a fifth preferred embodiment of the present invention.

Finally, the addition overflow detection circuit of the fifth preferred embodiment of the present invention shown in FIG. 16 is a modification to and is different from the addition overflow detection circuit of the fourth embodiment in that it includes a single fast adder-comparator in place of the two fast adder-comparators of the addition overflow detection circuit of the fourth embodiment. In particular, while, in the fourth embodiment shown in FIG. 13, the value of the addition result upper bit 112 is referred to to select one of the all bit 1 detection output 113 and the all bit 0 detection output 114 to be outputted, in the fifth embodiment shown in FIG. 16, when the value of the addition result upper bit 112 is 0, $k_j=0$ is applied, but when the value of the addition result upper bit 112 is 1, $k_j=1$ is applied, to the single fast adder-comparator 97 (in both cases, m+1≦i≦n) to obtain a fast adder-comparator output 117. Since the fast adder-comparator output 117 is equivalent to the selector 115 of FIG. 12, the adder 91, the 2-bit adder 92 and the decoder 96 may be similar to those of the fourth embodiment.

Figure 17:
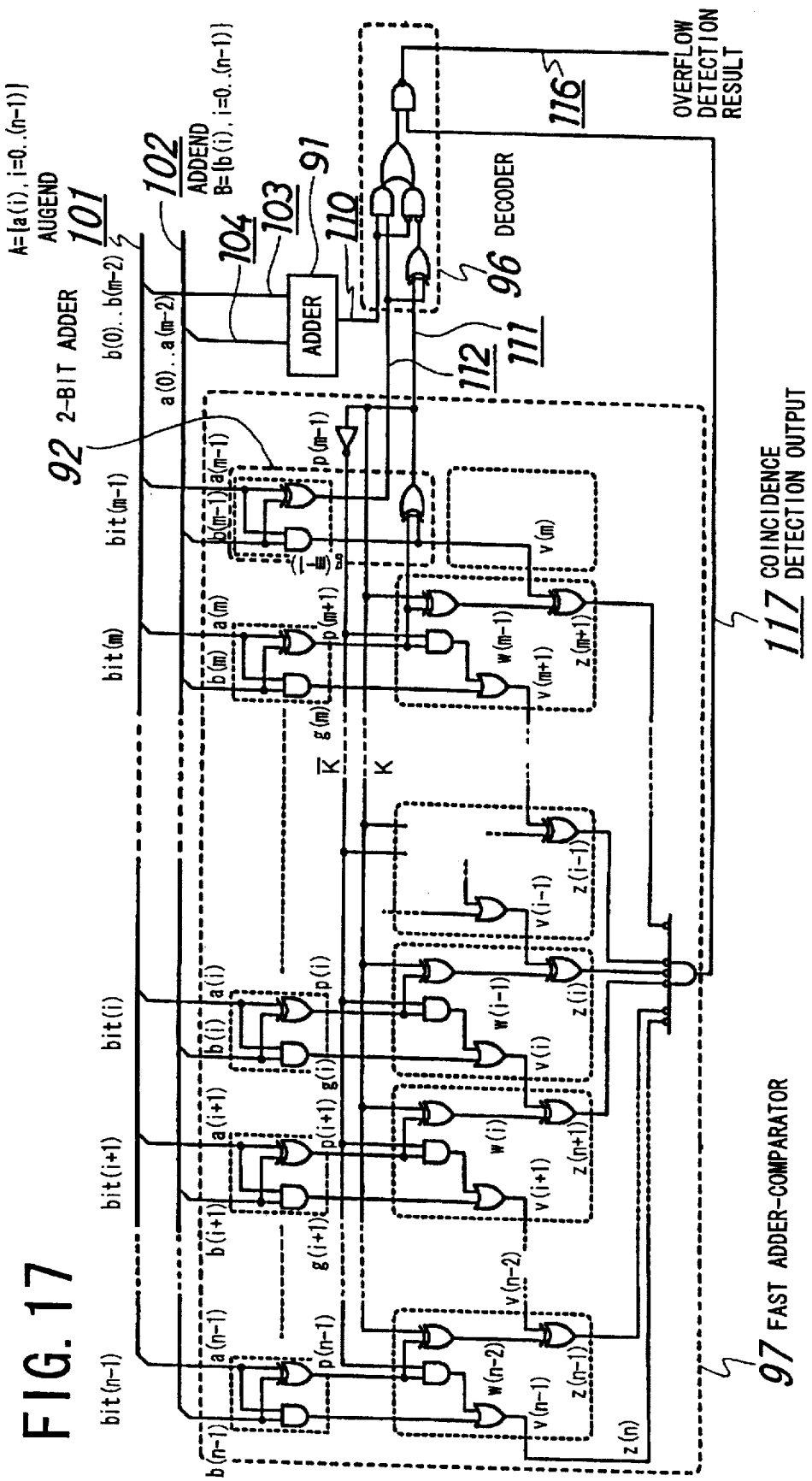
FIG. 17 is a circuit diagram showing an example of the addition overflow detection circuit of FIG. 16 where it is implemented using logic gates.
Figure 18:
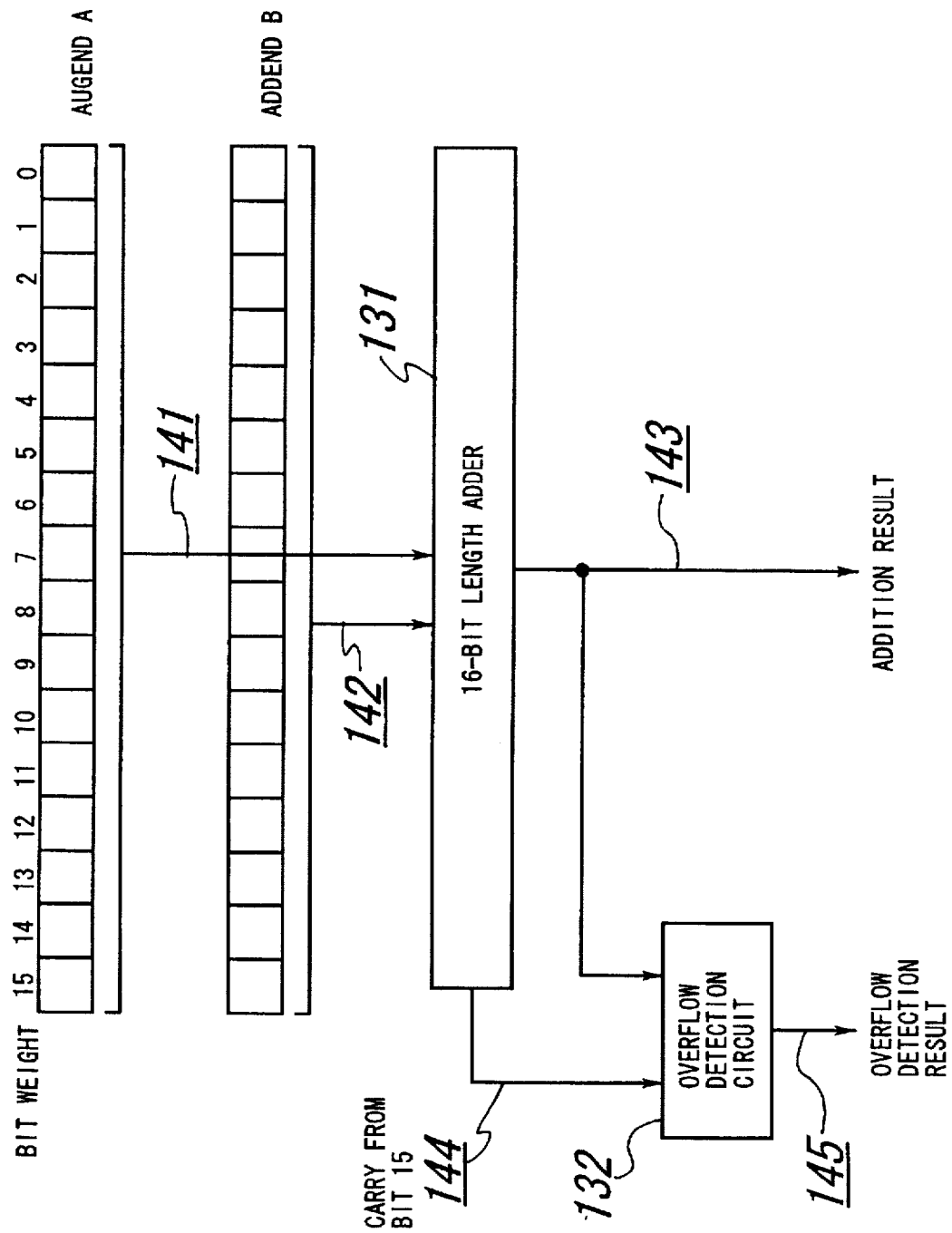
FIG. 18 is a block diagram showing a basic construction of a conventional addition overflow detection circuit.

FIG. 17 shows an example wherein the 2-bit adder 92, the fast adder-comparator 97, the selector 95 and the decoder 96 employed in the addition detection circuit of the fifth embodiment of FIG. 16 are realized using logic gates.

With the addition overflow detection circuit of the fifth embodiment described above, the number of fast adder-comparators required by two in the addition overflow detection circuit of the fourth embodiment is reduced to one and the circuit construction is simplified. However, the addition overflow detection circuit of the fifth embodiment can still produce an overflow detection result 116 at a rate substantially equal to that of the addition overflow detection circuit of the fourth embodiment.

It is to be noted that one of the addition overflow detection circuits of the first and second embodiments which detect an overflow of addition of unsigned numbers and one of the addition overflow detection circuits of the third, fourth and fifth embodiments which detect an overflow of addition of signed numbers are combined to construct a different addition overflow detection circuit which can detect one or both of an overflow when it is presumed that the inputs to the addition overflow detection circuit are unsigned numbers and another overflow when it is presumed that the inputs are signed numbers. Particularly, the addition overflow detection circuits of the first and third embodiments, the first and fourth embodiments or the second and fifth embodiments are much analogous to each other, and they can be combined with each other using elements most of which are common between them to construct an overflow detection circuit which can handle both of unsigned numbers and signed numbers efficiently.

Having now fully described the invention, it will be apparent to one of ordinary skill in the art that many changes and modifications can be made thereto without departing from the spirit and scope of the invention as set forth herein.

What is claimed is:

1. An addition overflow detection circuit for detecting that a result of addition of unsigned binary numbers, each having a bit length of n bits, cannot be represented correctly with a bit length of m bits such that an overflow occurs, n and m being integers, n being equal to or greater than m, comprising:

an adder having a bit length of m or more bits for adding lower m bits of an augend having a bit length of n bits and lower m bits of an addend having a bit length of n bits;

a first fast adder-comparator for detecting that all bits of a result of addition of upper n−m bits of the augend and upper n−m bits of the addend are all equal to 1;

a second fast adder-comparator for detecting that all bits of the result of addition of the upper n−m bits of the augend and the upper n−m bits of the addend are all equal to 0; and a selector for referring to a carry from an (m−1)th bit to an mth bit extracted from said adder to select and logically invert one of an all bit 1 detection output of said first fast adder-comparator and an all bit 0 detection output of said second fast adder comparator and outputting a result value as an overflow detection result.

2. An addition overflow detection circuit for detecting that a result of addition of unsigned binary numbers, each having a bit length of n bits, cannot be represented correctly with a bit length of m bits such that an overflow occurs, n and m being integers, n being equal to or greater than m, comprising:

- an adder having a bit length of m or more bits for adding lower m bits of an augend having a bit length of n bits and lower m bits of an addend having a bit length of n bits;
- a half adder for adding an mth bit of the augend and an mth bit of the addend;
- a fast adder-comparator for detecting that bits of a result of addition of upper n−m−1 bits of the augend and upper n−m−1 bits of the addend are equal to an output of said half adder; and
- an incoincidence detector for determining that the carry from an (m−1)th bit to the mth bit extracted from said adder and a coincidence detection output of said fast adder-comparator are not equal to each other and outputting a result of the determination as an overflow detection result.

3. An addition overflow detection circuit for detecting that a result of addition of signed binary numbers, each having a bit length of n bits, cannot be represented correctly with a bit length of m bits such that an overflow occurs, n and m being integers, n being equal to or greater than m, comprising:

- an adder having a bit length of m−1 or more bits for adding lower m−1 bits of an augend having a bit length of n bits and lower m−1 bits of an addend having a bit length of n bits;
- a first fast adder-comparator for detecting that all bits of a result of addition of upper n−m+1 bits of the augend and upper n−m+1 bits of the addend are equal to 1 except the lowermost bit;
- a second fast adder-comparator for detecting that all bits of the result of addition of the upper n−m+1 bits of the augend and the upper n−m+1 bits of the addend are all equal to 1;
- a third fast adder-comparator for detecting that all bits of the result of addition of the upper n−m+1 bits of the augend and the upper n−m+1 bits of the addend are equal to 0; and
- a decoder for producing an overflow detection result from totalling 4 bits of a carry from an (m−2)th bit to an (m−1)th bit extracted from said adder, an output of said first fast adder-comparator, an output of said second fast adder-comparator and an output of said third fast adder-comparator.

4. An addition overflow detection circuit for detecting that a result of addition of signed binary numbers, each having a bit length of n bits, cannot be represented correctly with a bit length of m bits such that an overflow occurs, n and m being integers, n being equal to or greater than m, comprising:

- an adder having a bit length of m−1 or more bits for adding lower m−1 bits of an augend having a bit length of n bits and lower m−1 bits of an addend having a bit length of n bits;
- a 2-bit adder for adding (m−1)th and mth bits of the augend and (m−1)th and mth bits of the addend;
- a first fast adder-comparator for detecting that all bits of a result of addition of upper n−m−1 bits of the augend and upper n−m−1 bits of the addend are all equal to 1;
- a second fast adder-comparator for detecting that all bits of the result of addition of the upper n−m−1 bits of the augend and the upper n−m−1 bits of the addend are all equal to 0;
- a selector for referring to the upper bit of a result of the addition of said 2-bit adder to select one of an all bit 1 detection output of said first fast adder-comparator and an all bit 0 detection output of said second fast adder-comparator; and
- a decoder for producing an overflow detection result from totalling 4 bits of a carry from an (m−2)th bit to the (m−1)th bit extracted from said adder, the upper bit and the lower bit of the result of the addition of said 2-bit adder and an output of said selector.

5. An addition overflow detection circuit as claimed in claim 4, wherein said first fast adder-comparator, said second fast adder-comparator and said selector are replaced by a single fast adder-comparator for detecting that all bits of a result of addition of the upper n−m−1 bits of the augend and the upper n−m−1 bits of the addend are equal to the upper bit of the result of the addition of said 2-bit adder.

6. An addition overflow detection circuit, comprising a first addition overflow detection circuit component which handles unsigned binary numbers and a second addition overflow detection circuit component which handles signed binary numbers, whereby said addition overflow detection circuit is capable of handling both unsigned numbers and signed numbers;

wherein said first addition overflow detection circuit component detects that a result of addition of unsigned binary numbers, each having a bit length of n bits, cannot be represented correctly with a bit length of m bits such that an overflow occurs, n and m being integers, n being equal to or greater than m, said first addition overflow detection circuit component comprising:

- an adder having a bit length of m or more bits for adding lower m bits of an augend having a bit length of n bits and lower m bits of an addend having a bit length of n bits;
- a first fast adder-comparator for detecting that all bits of a result of addition of upper n−m bits of the augend and upper n−m bits of the addend are all equal to 1;
- a second fast adder-comparator for detecting that all bits of the result of addition of the upper n−m bits of the augend and the upper n−m bits of the addend are all equal to 0; and
- a selector for referring to a carry from an (m−1)th bit to an mth bit extracted from said adder to select and logically invert one of an all bit 1 detection output of said first fast adder-comparator and an all bit 0 detection output of said second fast adder comparator and outputting a result value as an overflow detection result.

7. An addition overflow detection circuit, as recited in claim 6, wherein said second addition overflow detection circuit component detects that a result of addition of signed binary numbers, each having a bit length of n bits, cannot be represented correctly with a bit length of m bits such that an overflow occurs, n and m being integers, n being equal to or greater than m, said second addition overflow detection circuit component comprising:

- an adder having a bit length of m−1 or more bits for adding lower m−1 bits of an augend having a bit length of n bits and lower m−1 bits of an addend having a bit length of n bits;

a first fast adder-comparator for detecting that all bits of a result of addition of upper n−m+1 bits of the augend and upper n−m+1 bits of the addend are equal to 1 except the lowermost bit;

a second fast adder-comparator for detecting that all bits of the result of addition of the upper n−m+1 bits of the augend and the upper n−m+1 bits of the addend are all equal to 1;

a third fast adder-comparator for detecting that all bits of the result of addition of the upper n−m+1 bits of the augend and the upper n−m+1 bits of the addend are equal to 0; and a decoder for producing an overflow detection result from totalling 4 bits of a carry from an (m−2)th bit to an (m−1)th bit extracted from said adder, an output of said first fast adder-comparator, an output of said second fast adder-comparator and an output of said third fast adder-comparator.

8. An addition overflow detection circuit, as recited in claim 6, wherein said second addition overflow detection circuit component detects that a result of addition of signed binary numbers, each having a bit length of n bits, cannot be represented correctly with a bit length of m bits such that an overflow occurs, n and m being integers, n being equal to or greater than m, said second addition overflow detection circuit component comprising:

an adder having a bit length of m−1 or more bits for adding lower m−1 bits of an augend having a bit length of n bits and lower m−1 bits of an addend having a bit length of n bits;

a 2-bit adder for adding (m−1)th and mth bits of the augend and (m−1)th and mth bits of the addend;

a first fast adder-comparator for detecting that all bits of a result of addition of upper n−m−1 bits of the augend and upper nm−1 bits of the addend are all equal to 1;

a second fast adder-comparator for detecting that all bits of the result of addition of the upper n−m−1 bits of the augend and the upper n−m−1 bits of the addend are all equal to 0;

a selector for referring to the upper bit of a result of the addition of said 2-bit adder to select one of an all bit 1 detection output of said first fast adder-comparator and an all bit 0 detection output of said second fast adder-comparator; and a decoder for producing an overflow detection result from totalling 4 bits of a carry from an (m−2)th bit to the (m−1)th bit extracted from said adder, the upper bit and the lower bit of the result of the addition of said 2-bit adder and an output of said selector.

9. An addition overflow detection circuit as claimed in claim 8, wherein said second addition overflow detection circuit component, said first fast adder-comparator, said second fast adder-comparator and said selector are replaced by a single fast adder-comparator for detecting that all bits of a result of addition of the upper n−m−1 bits of the augend and the upper n−m−1 bits of the addend are equal to the upper bit of the result of the addition of said 2-bit adder.

10. An addition overflow detection circuit, comprising a first addition overflow detection circuit component which handles unsigned binary numbers and a second addition overflow detection circuit component which handles signed binary numbers, whereby said addition overflow detection circuit is capable of handling both unsigned numbers and signed numbers;

wherein said first addition overflow detection circuit component detects that a result of addition of unsigned binary numbers, each having a bit length of n bits, cannot be represented correctly with a bit length of m bits such that an overflow occurs, n and m being integers, n being equal to or greater than m, said first addition overflow detection circuit component comprising:

an adder having a bit length of m or more bits for adding lower m bits of an augend having a bit length of n bits and lower m bits of an addend having a bit length of n bits;

a half adder for adding an mth bit of the augend and an mth bit of the addend;

a fast adder-comparator for detecting that bits of a result of addition of upper n−m−1 bits of the augend and upper n−m−1 bits of the addend are equal to an output of said half adder; and an incoincidence detector for determining that the carry from an (m−1)th bit to the mth bit extracted from said adder and a coincidence detection output of said fast adder-comparator are not equal to each other and outputting a result of the determination as an overflow detection result.

11. An addition overflow detection circuit, as recited in claim 10, wherein said second addition overflow detection circuit component detects that a result of addition of signed binary numbers, each having a bit length of n bits, cannot be represented correctly with a bit length of m bits such that an overflow occurs, n and m being integers, n being equal to or greater than m, said second addition overflow detection circuit component comprising:

an adder having a bit length of m−1 or more bits for adding lower m−1 bits of an augend having a bit length of n bits and lower m−1 bits of an addend having a bit length of n bits;

a first fast adder-comparator for detecting that all bits of a result of addition of upper n−m+1 bits of the augend and upper n−m+1 bits of the addend are equal to 1 except the lowermost bit;

a second fast adder-comparator for detecting that all bits of the result of addition of the upper n−m+1 bits of the augend and the upper n−m+1 bits of the addend are all equal to 1;

a third fast adder-comparator for detecting that all bits of the result of addition of the upper n−m+1 bits of the augend and the upper n−m+1 bits of the addend are equal to 0; and a decoder for producing an overflow detection result from totalling 4 bits of a carry from an (m−2)th bit to an (m−1)th bit extracted from said adder, an output of said first fast adder-comparator, an output of said second fast adder-comparator and an output of said third fast adder-comparator.

12. An addition overflow detection circuit, as recited in claim 10, wherein said second addition overflow detection circuit component detects that a result of addition of signed binary numbers, each having a bit length of n bits, cannot be represented correctly with a bit length of m bits such that an overflow occurs, n and m being integers, n being equal to or greater than m, said second addition overflow detection circuit component comprising:

an adder having m−1 or more bits for adding lower m−1 bits of an augend having a bit length of n bits and lower m−1 bits of an addend having a bit length of n bits;

a 2-bit adder for adding (m−1)th and mth bits of the augend and (m−1)th and mth bits of the addend;

a first fast adder-comparator for detecting that all bits of a result of addition of upper n−m−1 bits of the augend and upper n−m−1 bits of the addend are all equal to 1;

a second fast adder-comparator for detecting that all bits of the result of addition of the upper n−m−1 bits of the augend and the upper n−m−1 bits of the addend are all equal to 0;

a selector for referring to the upper bit of a result of the addition of said 2-bit adder to select one of an all bit 1 detection output of said first fast adder-comparator and an all bit 0 detection output of said second fast adder-comparator; and a decoder for producing an overflow detection result from totalling 4 bits of a carry from an (m−2)th bit to an (m−1)th bit extracted from said adder, the upper bit and the lower bit of the result of the addition of said 2-bit adder and an output of said selector.

13. An addition overflow detection circuit as claimed in claim 12, wherein said second addition overflow detection circuit component, said first fast adder-comparator, said second fast adder-comparator and said selector are replaced by a single fast adder-comparator for detecting that all bits of a result of addition of the upper n−m−1 bits of the augend and the upper n−m−1 bits of the addend are equal to the upper bit of the result of the addition of said 2-bit adder.

* * * * *

UNITED STATES PATENT AND TRADEMARK OFFICE
CERTIFICATE OF CORRECTION

PATENT NO.   : 5,745,397
DATED        : April 28, 1998
INVENTOR(S)  : Kouhei NADEHARA It is certified that error(s) appears in the above-identified patent and that said Letters Patent is hereby corrected as shown below:

Column 6, line 1 delete "18" and insert --19--.
Column 10, line 63, equation 13 delete "$s_{m-1}$" and insert --$\Delta s_{m-1}$--.

Signed and Sealed this

Twentieth Day of October, 1998

Attest:

BRUCE LEHMAN

Attesting Officer    Commissioner of Patents and Trademarks